US012277951B2

(12) United States Patent
Park et al.

(10) Patent No.: US 12,277,951 B2
(45) Date of Patent: Apr. 15, 2025

(54) BEAMFORMING METHOD USING ONLINE LIKELIHOOD MAXIMIZATION COMBINED WITH STEERING VECTOR ESTIMATION FOR ROBUST SPEECH RECOGNITION, AND APPARATUS THEREFOR

(71) Applicant: MPWAV INC., Seoul (KR)

(72) Inventors: Hyung Min Park, Seoul (KR); Byung Joon Cho, Seoul (KR)

(73) Assignee: MPWAV INC., Seoul (KR)

(*) Notice: Subject to any disclaimer, the term of this patent is extended or adjusted under 35 U.S.C. 154(b) by 296 days.

(21) Appl. No.: 17/921,074

(22) PCT Filed: May 7, 2021

(86) PCT No.: PCT/KR2021/005759
§ 371 (c)(1),
(2) Date: Oct. 24, 2022

(87) PCT Pub. No.: WO2021/235750
PCT Pub. Date: Nov. 25, 2021

(65) Prior Publication Data

US 2023/0178089 A1 Jun. 8, 2023

(30) Foreign Application Priority Data

May 18, 2020 (KR) ........................ 10-2020-0058882

(51) Int. Cl.
*G10L 21/0208* (2013.01)
*G10L 21/0216* (2013.01)

(52) U.S. Cl.
CPC *G10L 21/0208* (2013.01); *G10L 2021/02082* (2013.01); *G10L 2021/02166* (2013.01)

(58) Field of Classification Search
CPC ............................................ G10L 2021/02166
(Continued)

(56) References Cited

U.S. PATENT DOCUMENTS 9,559,417 B1 * 1/2017 Schwarzwalder ... H01Q 3/2605
11,632,782 B2 * 4/2023 Xu ............................ H04L 5/14
370/277
(Continued)

FOREIGN PATENT DOCUMENTS

JP 2016142628 A * 8/2016
KR 20190097391 A * 2/2018 ......... G10L 21/0208
(Continued)

OTHER PUBLICATIONS

B. J. Cho, J. -M. Lee and H. -M. Park, "A Beamforming Algorithm Based on Maximum Likelihood of a Complex Gaussian Distribution With Time-Varying Variances for Robust Speech Recognition," in IEEE Signal Processing Letters, vol. 26, No. 9, pp. 1398-1402, Sep. 2019, doi: 10.1109/LSP.2019.2932848.keywo (Year: 2019).*

*Primary Examiner* — Bharatkumar S Shah
(74) *Attorney, Agent, or Firm* — Han's Law Office

(57) ABSTRACT

A target signal extraction apparatus according to an embodiment of the present invention may comprise a steering vector estimator and a beamformer. The steering vector estimator may generate an input signal covariance according to input results for each frequency over time, generate a noise covariance on the basis of a variance determined according to output results corresponding to the input results, and generate a steering vector on the basis of the input signal covariance and the noise covariance. The beamformer may generate a beamforming weight according to a beamforming covariance determined according to the variance and the steering vector, and provide the output results on the basis of the input results and the beamforming weight. The target signal extraction apparatus according to the present invention may generate the steering vector by calculating the noise covariance on the basis of the variance determined according to output results corresponding to
(Continued)

input results, and increases extraction performance for a target sound source by updating a beamforming weight.

12 Claims, 10 Drawing Sheets

(58) Field of Classification Search
USPC .......................................................... 704/226
See application file for complete search history.

(56) References Cited

U.S. PATENT DOCUMENTS

| | | | | |
|---|---|---|---|---|
| 11,875,820 | B1 * | 1/2024 | Hardie | G10L 15/193 |
| 11,922,095 | B2 * | 3/2024 | Meyers | G10L 15/26 |
| 2009/0164212 | A1 * | 6/2009 | Chan | G10L 21/0208 704/226 |
| 2017/0017394 | A1 * | 1/2017 | Wang | H04L 1/1819 |
| 2019/0043491 | A1 * | 2/2019 | Kupryjanow | G10L 21/0208 |
| 2024/0120652 | A1 * | 4/2024 | Salmani | H04B 7/0617 |

FOREIGN PATENT DOCUMENTS

| | | | | |
|---|---|---|---|---|
| KR | 10-2019-0073852 A | | 6/2019 | |
| KR | 10-2019-0091061 A | | 8/2019 | |
| KR | 10-2076760 B1 | | 2/2020 | |
| TW | 202026913 A | * | 7/2020 | G10L 15/02 |
| WO | WO-2019130239 A1 | * | 7/2019 | G10L 21/0208 |
| WO | WO-2021235750 A1 | * | 11/2021 | G10L 21/0208 |

* cited by examiner

BEAMFORMING METHOD USING ONLINE LIKELIHOOD MAXIMIZATION COMBINED WITH STEERING VECTOR ESTIMATION FOR ROBUST SPEECH RECOGNITION, AND APPARATUS THEREFOR

TECHNICAL FIELD

The present invention relates to a beamforming method using online likelihood maximization combined with steering vector estimation for robust speech s recognition, and an apparatus therefor.

BACKGROUND ART

A sound input signal input through a microphone may include not only a target voice required for voice recognition, but also noises that interfere with voice recognition. Various researches have been conducted to improve the performance of voice recognition by removing noise from the sound input signal and extracting only the desired target voice.

DISCLOSURE

Technical Problem

The technical problem to be achieved by the present invention provides a target signal extraction apparatus that generates a steering vector by calculating a noise covariance on the basis of the variance determined according to output results corresponding to input results, and increases extraction performance for a target sound source by updating a beamforming weight.

Technical Solution

A target signal extraction apparatus according to an embodiment of the present invention may include a steering vector estimator and a beamformer. The steering vector estimator may generate an input signal covariance according to input results for each frequency over time, generate a noise covariance based on a variance determined according to output results corresponding to the input results, and generate a steering vector based on the input signal covariance and the noise covariance. The beamformer may generate a beamforming weight according to a beamforming covariance determined according to the variance and the steering vector, and provide the output results based on the input results and the beamforming weight.

In an embodiment, initial values of the noise covariance and the beamforming covariance may be determined based on output results.

In an embodiment, initial values of the noise covariance and the beamforming covariance may be determined based on the input results.

In an embodiment, the noise covariance may be determined according to a larger value between the variance and a first constant value.

In an embodiment, the noise covariance may be normalized according to a larger value between the variance and the first constant value.

In an embodiment, the beamforming covariance may be determined according to a larger value between the variance and a second constant value.

In an embodiment, the target signal extraction apparatus may repeatedly operate the steering vector estimator and the beamformer until the beamforming weight converges.

A target signal extraction system according to an embodiment of the present invention may include a steering vector estimator and a beamformer. The steering vector estimator may generate an input signal covariance according to input results for each frequency over time, generate a noise covariance based on a variance determined according to output results corresponding to the input results and a predetermined mask, and generate a steering vector based on the input signal covariance and the noise covariance. The beamformer may generate a beamforming weight according to a beamforming covariance determined according to the variance and the steering vector, and provide the output results based on the input results and the beamforming weight.

In an embodiment, initial values of the noise covariance and the beamforming covariance may be determined according to a product of the input results and the mask.

In an embodiment, input results of the noise covariance may be updated as a product of the input results and the mask.

In an embodiment, the mask may be calculated for each frame index and frequency index.

In an embodiment, the noise covariance may be determined according to a larger value between the variance and a first constant value, and the noise covariance may be normalized according to the larger value between the variance and the first constant value.

In an embodiment, the beamforming covariance may be determined according to a larger value between the variance and a second constant value, and the target signal extraction apparatus may repeatedly operate the steering vector estimator and the beamformer until the beamforming weight converges.

An online target signal extraction apparatus according to an embodiment of the present invention may include a steering vector estimator and a beamformer. The steering vector estimator may generate a current frame input signal covariance generated based on a previous frame input signal covariance corresponding to a previous frame and current frame input results for each frequency according to a current frame, generating a current frame noise covariance based on a previous frame noise covariance corresponding to the previous frame, current frame input results corresponding to the current frame, and a current frame variance estimation value generated according to a previous frame beamforming weight corresponding to the previous frame, and generating a current frame steering vector based on the current frame input signal covariance, the current frame noise covariance, and a previous frame steering vector corresponding to the previous frame. The beamformer may generate a current frame beamforming variance estimation value generated according to a previous frame beamforming weight corresponding to the previous frame, current frame output results, and a previous frame variance corresponding to previous frame input results, generate a current frame beamforming inverse covariance generated according to a previous frame inverse covariance corresponding to the previous frame, the current frame input results, and the current frame beamforming variance estimation value, generate a current frame beamforming weight according to the current frame steering vector and the current frame beamforming inverse covariance, and provide current frame output results based on the current frame input results and the current frame beamforming weight.

In an embodiment, the current frame noise covariance may be normalized by a current frame variance estimation value.

An online target signal extraction system according to an embodiment of the present invention may include a steering vector estimator and a beamformer. The steering vector estimator may generate a current frame input signal covariance generated based on a previous frame input signal covariance corresponding to a previous frame and current frame input results for each frequency according to a current frame, generate a current frame noise covariance through a previous frame noise covariance corresponding to the previous frame, the current frame input results and a current frame variance estimation value generated according to a predetermined mask, and generate a current frame steering vector based on the current frame input signal covariance, the current frame noise covariance, and a previous frame steering vector corresponding to the previous frame. The beamformer may generate a current frame beamforming variance estimation value through the previous frame beamforming weight corresponding to the previous frame, the current frame input results, a previous frame variance corresponding to previous frame output results, and the predetermined mask, generate a current frame beamforming inverse covariance according to a previous frame inverse covariance, the current frame input results, and the current frame beamforming variance estimation value, generate a current frame beamforming weight according to the current frame steering vector and the current frame beamforming inverse covariance, and provide current frame output results based on the current frame input results and the current frame beamforming weight.

In an embodiment, the current frame noise covariance may be generated based on the previous frame noise covariance, the current frame input results, and the current frame variance estimation value generated through a predetermined mask.

In an embodiment, the current frame beamforming variance estimation value may be generated based on the previous frame beamforming weight, the current frame input results, the previous frame variance, and a predetermined mask.

In an embodiment, the weighted covariance and the weighted correlation vector may be determined according to a larger value between a variance and a second constant value, and the target signal extraction system may repeatedly operate the dereverberator, the steering vector estimator, and the beamformer until the dereverberated filter and the beamforming weight converge.

A target signal extraction apparatus according to an embodiment of the present invention may include a dereverberator, a steering vector estimator, and a beamformer. The dereverberator may generate a weighted covariance based on a variance determined according to past input results for each frequency over time and the output results corresponding to dereverberated input results, may generate a weighted correlation vector based on the input results for each frequency over time, the past input results, and the output results corresponding to the dereverberated input results, may generate a dereverberated filter based on the weighted covariance and the weighted correlation vector, and may generate the dereverberated input results based on the input results, the past input results, and the dereverberated filter. The steering vector estimator may generate the input signal covariance according to the dereverberated input results, may generate the noise covariance based on the variance determined according to the output results corresponding to the input results, and may generate the steering vector based on the input signal covariance and the noise covariance. The beamformer may generate the beamforming weight according to a beamforming covariance determined according to the variance, and the steering vector, and provide the output results based on the dereverberated input results and the beamforming weight.

In an embodiment, the weighted covariance, the weighted correlation vector, the noise covariance, and the beamforming covariance may be determined based on the output results.

In an embodiment, initial values of the weighted covariance and the weighted correlation vector may be determined based on the input results.

In an embodiment, the weighted covariance and the weighted correlation vector may be determined according to a larger value between the variance and a second constant value.

In an embodiment, initial values of the noise covariance and the beamforming covariance may be determined based on the dereverberated input results.

In an embodiment, the noise covariance may be determined according to a larger value between the variance and a first constant value. Also, the noise covariance may be normalized according the larger value between the variance and the first constant value.

In an embodiment, the beamforming covariance may be determined according to the larger value between the variance and the second constant value.

In an embodiment, the target extraction apparatus may repeatedly operate the dereverberator, the steering vector estimator, and the beamformer until the dereverberated filter and the beamforming weight converge.

A target signal extraction system according to an embodiment of the present invention may include a dereverberator, a steering vector estimator, and a beamformer. The dereverberator may include a weighted covariance generator, a weighted correlation vector generator, a dereverberated filter generator, and a dereverberated signal generator. The dereverberator may generate a weighted covariance based on a variance determined according to past input results for each frequency over time and the output results corresponding to dereverberated input results, may generate a weighted correlation vector based on the input results for each frequency over time, the past input results, and the output results corresponding to the dereverberated input results, may generate a dereverberated filter based on the weighted covariance and the weighted correlation vector, and may generate the dereverberated input results based on the input results, the past input results, and the dereverberated filter. The steering vector estimator may generate the input signal covariance according to the dereverberated input results for each frequency over time, may generate the noise covariance based on the variance determined according to the output results corresponding to the input results and a predetermined mask, and may generate the steering vector based on the input signal covariance and the noise covariance. The beamformer may generate the beamforming weight according to the dereverberated input results, the beamforming covariance determined according to the variance, and the steering vector, and provide the output results based on the dereverberated input results and the beamforming weight.

In an embodiment, initial values of the noise covariance and the beamforming covariance may be determined according to a product of the dereverberated input results and the mask.

In an embodiment, the dereverberated input results of the noise covariance may be updated as a product of the dereverberated input results and the mask.

In an embodiment, the mask may be calculated for each frame index and frequency index.

In an embodiment, the noise covariance may be determined according to a larger value between the variance and a first constant value, and the noise covariance may be normalized according to the larger value between the variance and the first constant value.

In an embodiment, the beamforming covariance may be determined according to a larger value between the variance and a second constant value, and the target signal extraction system may repeatedly operate the dereverberator, the steering vector estimator, and the beamformer until the dereverberated filter and the beamforming weight converge.

An online target signal extraction apparatus according to an embodiment of the present invention may include a dereverberator, a steering vector estimator, and a beamformer. The dereverberator may include gain vector generator, a weighted inverse covariance generator, dereverberated filter generator, and a dereverberated signal generator.

The dereverberator may generate a current frame dereverberated output estimation value based on the current frame input results corresponding to a current frame, current frame past input results, and a previous frame dereverberated filter corresponding to a previous frame, may generate a current frame dereverberated variance estimation value based on the previous frame variance corresponding to the previous frame and the current frame dereverberated output estimation value, may generate a current frame gain vector based on a previous frame weighted inverse covariance corresponding to the previous frame, the current frame dereverberated output estimation value, and the current frame past input results, may generate a current frame weighted inverse covariance based on the previous frame weighted inverse covariance, the current frame past input results, and the current frame gain vector, may generate a current frame dereverberated filter corresponding to the current frame based on the current frame gain vector, the current frame past input results, and the previous frame dereverberated filter corresponding to the previous frame, and may generate current frame dereverberated input results based on the current frame input results, the current frame past input results, and the current frame dereverberated filter.

The steering vector estimator may generate the current frame input signal covariance generated based on the previous frame input signal covariance corresponding to a previous frame and the current frame dereverberated input results for each frequency according to a current frame, may generate a current frame variance estimation value based on the current frame dereverberated input results and the previous frame beamforming weight, may generate the current frame noise covariance based on the previous frame noise covariance corresponding to the previous frame and the current frame variance estimation value, and may generate the current frame steering vector based on the current frame input signal covariance, the current frame noise covariance, and the previous frame steering vector.

The beamformer may generate a current frame beamforming variance estimation value according to the previous frame beamforming weight, the current frame dereverberated input results, and the previous frame variance, may generate the current frame beamforming inverse covariance based on the previous frame inverse covariance, the current frame dereverberated input results, and the current frame beamforming variance estimation value, may generate the current frame beamforming weight according to the current frame beamforming inverse covariance and the current frame steering vector, and may provide the current frame output results based on the current frame dereverberated input results and the current frame beamforming weight.

In an embodiment, the current frame noise covariance may be normalized by the current frame variance estimation value.

In an embodiment, the online target signal extraction apparatus according to the present invention may generate the current frame gain vector based on the current frame variance estimation value determined according to the current frame output results corresponding to the current input results, may generate the current frame frame dereverberated input results by calculating the current frame dereverberated filter, may generate the current frame steering vector by calculating the current frame noise covariance, and increase extraction performance for a target sound source by updating the current frame beamforming weight.

An online target signal extraction system according to an embodiment of the present invention may include a dereverberator, a steering vector estimator, and a beamformer. The dereverberator may include a gain vector generator, a weighted inverse covariance generator, a dereverberated filter generator, and a dereverberated signal generator.

The dereverberator may generate the current frame dereverberated output estimation value based on the current frame input results corresponding to a current frame, the current frame past input results, and the previous frame dereverberated filter corresponding to a previous frame, may generate a current frame dereverberated variance estimation value based on the previous frame variance corresponding to the previous frame and the current frame dereverberated output estimation value, may generate the current frame gain vector based on the previous frame weighted inverse covariance corresponding to the previous frame, the current frame dereverberated output estimation value, and the current frame past input results, may generate the current frame weighted inverse covariance based on the previous frame weighted inverse covariance, the current frame past input results, and the current frame gain vector, may generate the current frame dereverberated filter corresponding to the current frame based on the current frame gain vector, the current frame past input results, and the previous frame dereverberated filter corresponding to the previous frame, and may generate the current frame dereverberated input results based on the current frame input results, the current frame past input results, and the current frame dereverberated filter.

The steering vector estimator may generate the current frame input signal covariance generated based on the previous frame input signal covariance corresponding to a previous frame and the current frame dereverberated input results for each frequency according to a current frame, may generate the current frame noise covariance based on the previous frame noise covariance corresponding to the previous frame, the current frame dereverberated input results, and a current frame variance estimation value generated through a predetermined mask, and may generate the current frame steering vector based on the current frame input signal covariance, the current frame noise covariance, and the previous frame steering vector.

The beamformer may generate the current frame beamforming variance estimation value according to the previous frame beamforming weight, the current frame dereverberated input results, a previous frame variance, and the predetermined mask, may generate the current frame beamforming inverse covariance according to the previous frame inverse covariance, the current frame dereverberated input results, and the current frame beamforming variance estimation value, may generate the current frame beamforming weight according to the current frame steering vector and the current frame beamforming inverse covariance, and may provide the current frame output results based on the current frame dereverberated input results and the current frame beamforming weight.

In an embodiment, the current frame noise covariance may be generated based on the previous frame noise covariance, the current frame dereverberated input results, and the current frame variance estimation value generated through the predetermined mask.

In an embodiment, the current frame beamforming variance estimation value may be generated based on the previous frame beamforming weight, the current frame dereverberated input results, the previous frame variance, and the predetermined mask.

In addition to the technical problems of the present invention mentioned above, other features and advantages of the present invention will be described below or will be clearly understood by those of ordinary skill in the art from such description and explanation.

Advantageous Effects

According to the present invention as described above, the effect is as follows.

The target signal extraction apparatus according to the present invention may generate the steering vector by calculating the noise covariance on the basis of the variance determined according to the output results corresponding to the input results, and increase the extraction performance for the target sound source by updating the beamforming weight.

In addition, other features and advantages of the present invention may be newly identified through embodiments of the present invention.

BEST MODE

Figure 1:
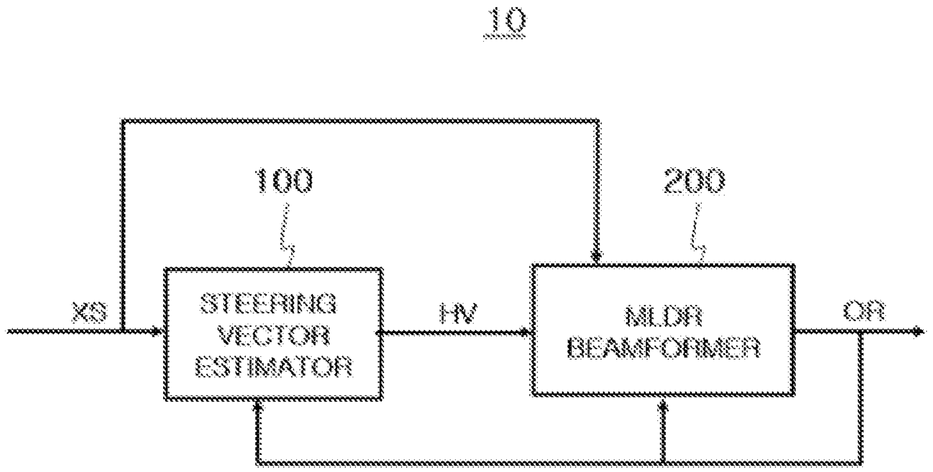
FIG. 1 is a diagram illustrating a target signal extraction apparatus according to embodiments of the present invention.

In the present specification, it should be noted that, in adding reference numerals to components of each drawing, the same numerals are used only for the same components even though the same components are shown in different drawings.

On the other hand, the meaning of the terms described in the present specification should be understood as follows.

The singular expression should be understood as including the plural expression unless the context clearly defines otherwise, and the scope of rights should not be limited by these terms.

It should be understood that terms such as “comprise” or “have” do not preclude the possibility of addition or existence of one or more other features or numbers, steps, operations, components, parts, or combinations thereof.

Hereinafter, preferred embodiments of the present invention designed to solve the above problem will be described in detail with reference to the accompanying drawings.

Figure 2:
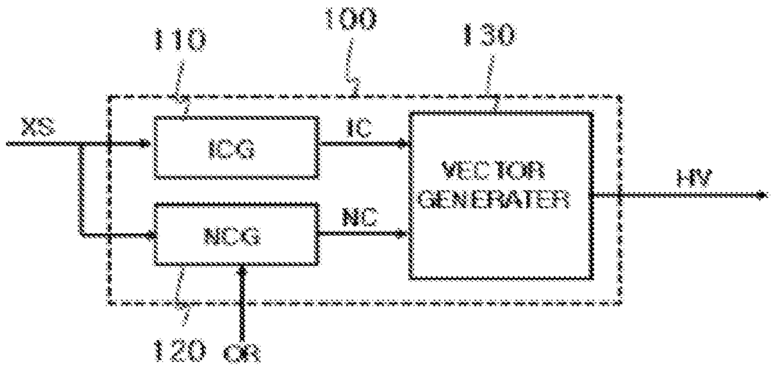
FIG. 2 is a diagram illustrating an example of a steering vector estimator included in the target signal extraction apparatus of FIG. 1.
Figure 3:
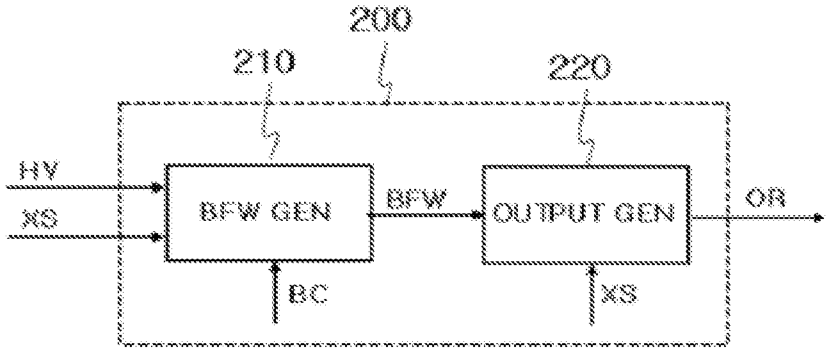
FIG. 3 is a diagram illustrating an example of a beamformer included in the target signal extraction apparatus.

FIG. 1 is a diagram illustrating a target signal extraction apparatus according to embodiments of the present invention, FIG. 2 is a diagram illustrating an example of a steering vector estimator included in the target signal extraction apparatus of FIG. 1, and FIG. 3 is a diagram illustrating an example of a beamformer included in the target signal extraction apparatus.

Referring to FIGS. 1 to 3, a target signal extraction apparatus 10 according to an embodiment of the present invention may include a steering vector estimator 100 and a beamformer 200. The steering vector estimator 100 may include an input signal covariance generator 110, a noise covariance generator 120, and a vector generator 130. The steering vector estimator 100 may generate an input signal covariance IC according to input results XS for each frequency over time, may generate a noise covariance NC based on a variance determined according to output results OR corresponding to the input results XS, and may generate a steering vector HV based on the input signal covariance IC and the noise covariance NC.

For example, the input signal covariance generator 110 may generate the input signal covariance IC according to the input results XS for each frequency over time.

The input signal covariance IC may be expressed as [Equation 1] below.

$$R_k^x = \frac{1}{N_k}\sum_{l=1}^{N_k}\left(x_{l,k}x_{l,k}^H\right) \quad \text{[Equation 1]}$$

Here, $R_k^x$ may be an input signal covariance, $N_k$ may be the number of frames, l may be a frame index, k may be a frequency index, and $x_{l,k}$ may be input results.

Also, the noise covariance generator 120 may generate the noise covariance NC based on the variance determined according to the output results OR corresponding to the input results XS.

The noise covariance NC may be expressed as [Equation 2] below.

$$R_k^{\hat{n}} = \frac{1}{\sum_{l=1}^{N_k} 1/\max(\lambda_{l,k}, \hat{\varepsilon}_k)}\sum_{l=1}^{N_k}\left(\frac{x_{l,k}x_{l,k}^H}{\max(\lambda_{l,k}\hat{\varepsilon}_k)}\right) \quad \text{[Equation 2]}$$

Here, $R_k^{\hat{n}}$ may be a noise covariance, $\lambda_{l,k}$ may be a variance, $\hat{\varepsilon}_k$ may be a first constant value, $N_k$ may be the number of frames, l may be a frame index, k may be a frequency index, and $x_{l,k}$ may be input results.

Also, the vector generator 130 may generate the steering vector HV based on the input signal covariance IC and the noise covariance NC.

The steering vector HV may be expressed as [Equation 3] below.

$$R_k^{\hat{s}} = R_k^x - R_k^{\hat{n}}, h_k = \text{MaxEig}\{R_k^{\hat{s}}\} \quad \text{[Equation 3]}$$

Here, $R_k^{\hat{s}}$ may be a target sound source covariance, MaxEig{•} may be an eigenvector extraction function corresponding to the maximum eigenvalue, and $h_k$ may be a steering vector.

The beamformer 200 may generate a beamforming weight BFW according to the input results XS, a beamforming covariance BC determined according to the variance, and the steering vector HV, and provide the output results OR based on the input results XS and the beamforming weight BFW.

For example, the beamformer 200 may include a beamforming weight generator 210 and an output generator 220. The beamforming weight generator 210 may generate the beamforming weight BFW according to the beamforming covariance BC determined according to the input results XS and the variance and the steering vector HV.

The beamforming covariance BC may be expressed as [Equation 4] below.

$$R_k^{\tilde{x}} = \sum_{l=1}^{N_k}\left(\frac{x_{l,k}x_{l,k}^H}{\max(\lambda_{l,k}, \varepsilon_k)}\right) \quad \text{[Equation 4]}$$

Here, $R_k^{\tilde{x}}$ may be a beamforming covariance, and $\varepsilon_k$ may be a second constant value.

The beamforming weight BFW may be expressed as [Equation 5] below.

$$w_k = \frac{\left(R_k^{\tilde{x}} + \delta_k I\right)^{-1} h_k}{h_k^H\left(R_k^{\tilde{x}} + \delta_k I\right)^{-1} h_k} \quad \text{[Equation 5]}$$

Here, $w_k$ may be a beamforming weight, $\delta_k$ may be a diagonal loading constant value, and I may be an identity matrix.

The output generator 220 may provide the output results OR based on the input results XS and the beamforming weight BFW.

The output results OR may be expressed as [Equation 6] below.

$$Y_{l,k} = w_k^H x_{l,k}, \lambda_{l,k} = |Y_{l,k}|^2, \quad \text{[Equation 6]}$$

Here, $Y_{l,k}$ may be output results, and $\lambda_{l,k}$ may be a variance.

In an embodiment, the variance of each of the noise covariance NC and the beamforming covariance BC may be determined based on the output results OR. For example, the variance of each of the noise covariance NC and the beamforming covariance BC may be expressed as [Equation 7] below.

$$\lambda_{l,k} = \frac{1}{2\tau + 1}\sum_{m=l-\tau}^{l+\tau} Y_{m,k}Y_{m,k}^* \quad \text{[Equation 7]}$$

Here, $Y_{m,k}$ may be output results, and $\tau$ may be the number of adjacent frames.

In an embodiment, initial values of the noise covariance NC and the beamforming covariance BC may be determined based on the input results XS. For example, an initial value of the variance used in each of the noise covariance NC and the beamforming covariance BC may be expressed as [Equation 8] below.

$$\lambda_{l,k} = |X_{l,k}|^2, \lambda_{l,k} = \frac{1}{2\tau + 1}\sum_{m=l+\tau}^{l+\tau} X_{m,k}X_{m,k}^* \quad \text{[Equation 8]}$$

Here, $X_{l,k}$ and $X_{m,k'}$ may be input results, and $\tau$ may be the number of adjacent frames.

In an embodiment, the noise covariance NC may be determined according to a larger value between a variance and a first constant value. Also, the noise covariance NC may be normalized according to a larger value between a variance and a first constant value. For example, the first constant value may be $10^{-6}$.

In an embodiment, the beamforming covariance BC may be determined according to a larger value between a variance and a second constant value. For example, the second constant value may be $10^{-6}$.

In an embodiment, the target signal extraction apparatus 10 may repeatedly operate the steering vector estimator 100 and the beamformer 200 until the beamforming weight BFW converges. After generating the steering vector HV through the steering vector estimator 100, the target signal extraction apparatus 10 may repeat an operation of generating the beamforming weight BFW through the beamformer 200. The target signal extraction apparatus 10 according to the present invention may generate the steering vector HV by calculating the noise covariance NC based on the variance determined according to the output results OR corresponding to the input results XS, and increase extraction performance for a target sound source by updating the beamforming weight BFW.

Figure 4:
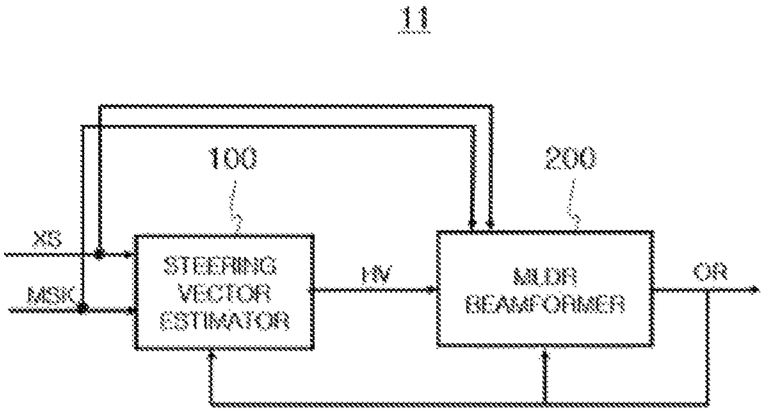
FIG. 4 is a diagram illustrating a target signal extraction system according to embodiments of the present invention.
Figure 5:
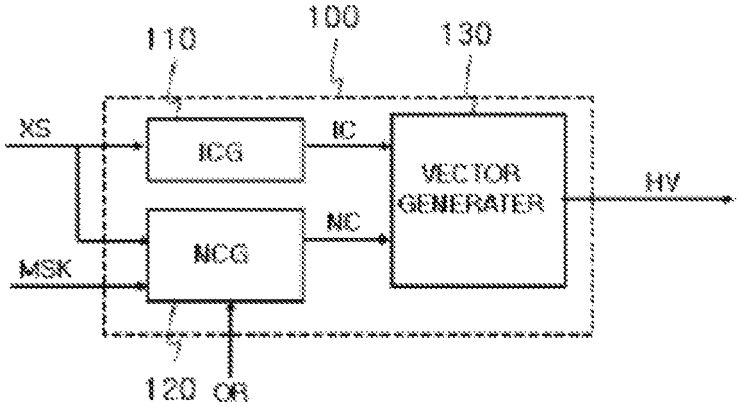
FIG. 5 is a diagram illustrating an example of a steering vector estimator included in the target signal extraction system of FIG. 4.
Figure 6:
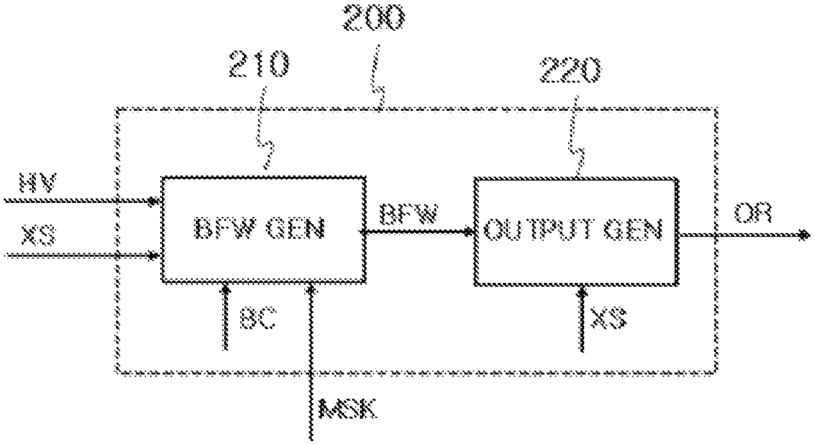
FIG. 6 is a diagram illustrating an example of a beamformer included in the target signal extraction system of FIG. 4.

FIG. 4 is a diagram illustrating a target signal extraction system according to embodiments of the present invention, FIG. 5 is a diagram illustrating an example of a steering vector estimator included in the target signal extraction system of FIG. 4, and FIG. 6 is a diagram illustrating an example of a beamformer included in the target signal extraction system of FIG. 4.

Referring to FIGS. 4 to 6, a target signal extraction system 11 according to an embodiment of the present invention may include the steering vector estimator 100 and the beamformer 200. The steering vector estimator 100 may include the input signal covariance generator 110, the noise covariance generator 120, and the vector generator 130. The steering vector estimator 100 may generate the input signal covariance IC according to the input results XS for each frequency over time, may generate the noise covariance NC based on a variance determined according to the output results OR corresponding to the input results XS and a predetermined mask MSK, and may generate the steering vector HV based on the input signal covariance IC and the noise covariance NC.

The beamformer 200 may generate the input results XS and the beamforming weight BFW according to the beamforming covariance BC determined according to the variance and the steering vector HV, and provide the output results OR based on the input results XS and the beamforming weight BFW.

Contents of [Equation 1] to [Equation 6] described with reference to FIGS. 1 to 3 may be equally applied to the target signal extraction system 11 according to the present invention.

In an embodiment, initial values of the noise covariance NC and the beamforming covariance may be determined according to a product of the input results XS and the mask MSK. For example, an initial value of a variance used in the noise covariance NC may be expressed as [Equation 9] below.

$$\lambda_{l,k} = \left|\overline{M}_{l,k} X_{l,k}\right|^2,\ \lambda_{l,k} = \frac{1}{2\tau+1}\sum_{m=l-\tau}^{l+\tau}\left|\overline{M}_{m,k} X_{m,k}\right|^2 \quad \text{[Equation 9]}$$

Here, $\overline{M}_{l,k}$ may be a mask.

In an embodiment, the input results XS of the noise covariance NC may be updated as the product of the input results XS and the mask MSK. For example, the input results XS used in the noise covariance NC may be updated as [Equation 10] below.

$$x_{l,k} \leftarrow (1-\overline{M}_{l,k})x_{l,k} \quad \text{[Equation 10]}$$

Here, $\overline{M}_{l,k}$ may be a mask.

In an embodiment, the mask MSK may be calculated for each frame index and frequency index. For example, a mask for each frame index and frequency index may be calculated based on a neural network or diffuseness.

In an embodiment, the noise covariance NC may be determined according to a larger value between a variance and a first constant value, and the noise covariance NC may be normalized according to the larger value between the variance and the first constant value.

In an embodiment, the beamforming covariance BC may be determined according to a larger value between a variance and a second constant value, and the target signal extraction system 11 may repeatedly operate the steering vector estimator 100 and the beamformer 200 until the beamforming weight BFW converges.

Figure 7:
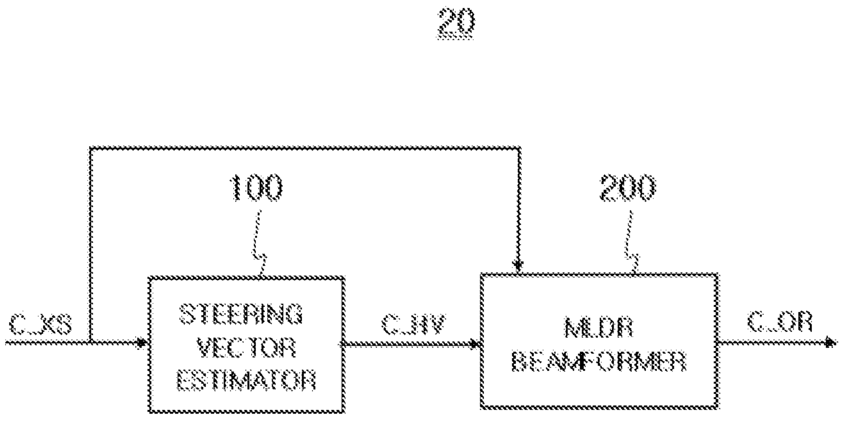
FIG. 7 is a diagram illustrating an online target signal extraction apparatus according to embodiments of the present invention.
Figure 8:
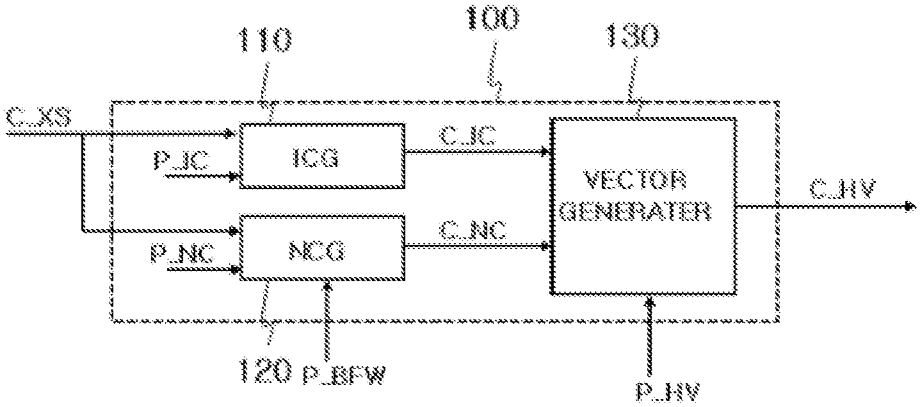
FIG. 8 is a diagram illustrating an example of a steering vector estimator included in the online target signal extraction apparatus of FIG. 7.
Figure 9:
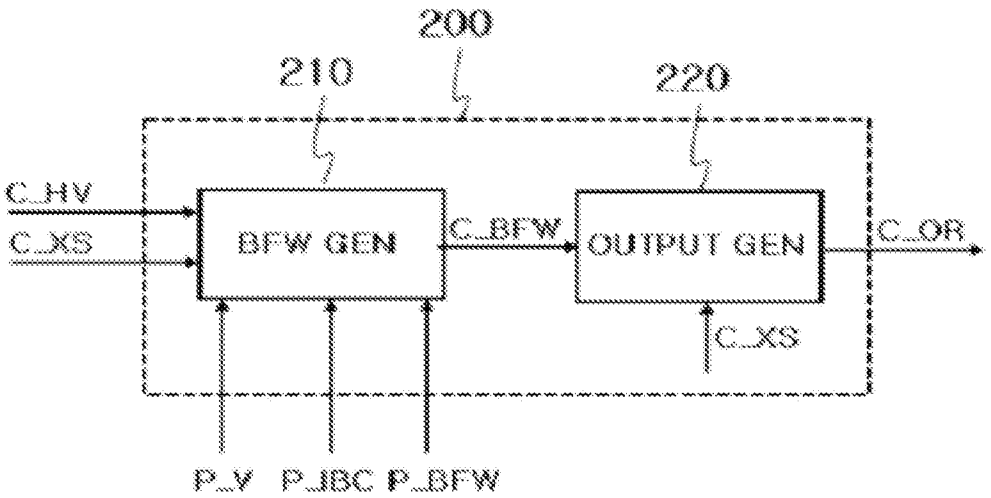
FIG. 9 is a diagram illustrating an example of a beamformer included in the online target signal extraction apparatus of FIG. 7.

FIG. 7 is a diagram illustrating an online target signal extraction apparatus according to embodiments of the present invention, FIG. 8 is a diagram illustrating an example of a steering vector estimator included in the online target signal extraction apparatus of FIG. 7, and FIG. 9 is a diagram illustrating an example of a beamformer included in the online target signal extraction apparatus of FIG. 7.

Referring to FIGS. 7 to 9, an online target signal extraction apparatus 20 according to an embodiment of the present invention may include the steering vector estimator 100 and the beamformer 200. The steering vector estimator 100 may include the input signal covariance generator 110, the noise covariance generator 120, and the vector generator 130. The steering vector estimator 100 may generate a current frame input signal covariance C_IC generated based on a previous frame input signal covariance P_IC corresponding to a previous frame and current frame input results C_XS for each frequency according to a current frame, may generate a current frame variance estimation value based on the current frame input results C_XS and a previous frame beamforming weight P_BFW, may generate a current frame noise covariance C_NC based on the previous frame noise covariance P_NC corresponding to the previous frame and the current frame variance estimation value, and may generate a current frame steering vector C_HV based on the current frame input signal covariance C_IC, the current frame noise covariance C_NC, and a previous frame steering vector P_HV.

For example, the input signal covariance generator 110 may generate the current frame input signal covariance C_IC generated based on the previous frame input signal covariance P_IC corresponding to the previous frame and the current frame input results C_XS for each frequency according to the current frame.

The current frame input signal covariance C_IC may be expressed as [Equation 11] below.

$$R^x_{l,k} = \frac{\sum_{m=1}^{l-1}\gamma^{l-m}}{\sum_{m=1}^{l}\gamma^{l-m}} R^x_{l-1,k} + \frac{x_{l,k}x^H_{l,k}}{\sum_{m=1}^{l}\gamma^{l-m}} \quad \text{[Equation 11]}$$

Here, $R_{l,k}^{x}$ may be a current frame input signal covariance, $R_{l-1,k}^{x}$ may be a previous frame input signal covariance, $\gamma^{l-m}$ may be a forgetting factor, l may be a frame index, k may be a frequency index, and $x_{l,k}$ may be input results.

In addition, the noise covariance generator 120 may generate the current frame noise covariance C_NC based on the previous frame noise covariance P_NC corresponding to the previous frame and the current frame variance estimation value generated according to the current frame input results C_XS for each frequency and the previous frame beamforming weight P_BFW corresponding to the previous frame input results.

The current frame noise covariance C_NC may be expressed as [Equation 12] below.

[Equation 12]

$$R^{\hat{n}}_{l,k} = \frac{\sum_{m=1}^{l-1} \gamma^{l-m}\left(1/\hat{\lambda}_{l,k}\right)}{\sum_{m=1}^{l-1} \gamma^{l-m}\left(1/\hat{\lambda}_{l,k}\right)} R^{\hat{n}}_{l-1,k} + \frac{1}{\sum_{m=1}^{l} \gamma^{l-m}\left(1/\hat{\lambda}_{l,k}\right)} \left(\frac{x_{l,k} x^{H}_{l,k}}{\hat{\lambda}_{l,k}}\right)$$

$$\tilde{Y}_{l,k} = w^{H}_{l-1,k} x_{l,k} \; \hat{\lambda}_{l,k} = \max\left(|\tilde{Y}_{l,k}|^{2}, \hat{\varepsilon}'_{k}\right)$$

Here, $R_{l,k}^{\hat{n}}$ may be a current frame noise covariance, $\gamma^{l-m}$ may be a forgetting factor, $R_{1-l,k}^{\hat{n}}$ may be a previous frame noise covariance, $\hat{\lambda}_{l,k}$ may be a current frame variance estimation value, $\tilde{Y}_{l,k}$ may be current frame estimated output results, $w_{l-1,k}^{H}$ may be a previous frame beamforming weight, $x_{l,k}$ may be current frame input results, and $\hat{\varepsilon}'_{k}$ may be a third constant value.

Also, the vector generator 130 may generate the current frame steering vector C_HV based on the current frame input signal covariance C_IC and the current frame noise covariance C_NC.

The current frame steering vector C_HV may be expressed as [Equation 13] below.

[Equation 13]

$$\tilde{h}_{i,k} = h_{i-1,k}$$

$$\tilde{h}_{i,k} = R^{\hat{s}}_{l,k} \tilde{h}_{l,k} \;\; \overline{h}_{j,k} = \hat{h}_{l,k} / \|h_{l,k}\| \;\; h_{j,k} = \overline{h}_{l,k} / \overline{h}^{(1)}_{l,k}$$

Here, $h_{l,k}$ may be a current frame steering vector, $\tilde{h}_{l,k}$ may be a previous frame steering vector, $R_{l,k}^{i}$ may be a current frame target sound source covariance, $\overline{h}_{l,k}$ may be a normalized current frame steering vector, and $\overline{h}_{l,k}^{(l)}$ may be one element of the normalized current frame steering vector.

The beamformer 200 may generate a current frame beamforming variance estimation value according to the previous frame beamforming weight P_BFW, the current frame input results C_XS, and a previous frame variance P_V, may generate a current frame beamforming inverse covariance C_IBC based on a previous frame inverse covariance P_IBC, the current frame input results C_XS, and the current frame beamforming variance estimation value, may generate a current frame beamforming weight C_BFW according to the current frame beamforming inverse covariance C_IBC and the current frame steering vector C_HV, and may provide current frame output results C_OR based on the current frame input results C_XS and the current frame beamforming weight C_BFW.

For example, the beamformer 200 may include the beamforming weight generator 210 and the output generator 220. The beamforming weight generator 210 may generate a current frame beamforming variance estimation value according to the current frame input results C_XS, the previous frame beamforming weight P_BFW, and a previous frame variance P_V, may generate the current frame beamforming inverse covariance C_IBC through the current frame input results C_XS, the previous frame beamforming inverse covariance P_IBC, and the current frame beamforming variance estimation value, and may generate the current frame beamforming weight C_BFW according to the current frame beamforming inverse covariance C_IBC and the current frame steering vector C_HV.

The current frame beamforming variance estimation value may be expressed as [Equation 14] below.

$$\tilde{\lambda}_{l,k} = \max(\beta\lambda_{l-1,k} + (1-\beta)|\tilde{Y}_{l,k}|^{2} \cdot \varepsilon'_{k}) \quad \text{[Equation 14]}$$

Here, $\tilde{\lambda}_{l,k}$ may be a current frame beamforming variance estimation value, $\tilde{Y}_{l,k}$ may be current frame estimation output results, $\lambda_{l-1,k}$ may be a previous frame variance, β, may be a weight, and $\varepsilon'_{k}$ may be a fourth constant value.

The current frame beamforming weight C_BFW may be expressed as [Equation 15] below.

$$w_{l,k} = \frac{\Psi_{l,k} h_{l,k}}{h^{H}_{l,k} \Psi_{l,k} h_{l,k}}, \; \Psi_{l,k} = \gamma^{-1}\left(\Psi_{l-1,k} - \frac{\Psi_{l-1,k} x_{l,k} x^{H}_{l,k} \Psi_{l-1,k}}{\gamma\hat{\lambda}_{l,k} + x^{H}_{l,k} \Psi_{l-1,k} x_{l,k}}\right) \quad \text{[Equation 15]}$$

Here, $w_{l,k}$ may be a current frame beamforming weight, $\Psi_{l-1,k}$ may be a previous frame beamforming inverse covariance, $h_{l,k}$ may be a current frame steering vector, and $\Psi_{l,k}$ may be a current frame beamforming inverse covariance.

The output generator 220 may provide the current frame output results C_OR based on the current frame input results C_XS and the current frame beamforming weight C_BFW.

The output results may be expressed as [Equation 16] below.

$$Y_{l,k} = w_{l,k}^{H} x_{l,k}, \lambda_{l,k} = \beta\lambda_{l-1,k} + (1-\beta)|Y_{l,k}|^{2} \quad \text{[Equation 16]}$$

Here, $Y_{l,k}$ may be current frame output results, and $\lambda_{l,k}$ may be current frame variance.

In an embodiment, the current frame noise covariance C_NC may be normalized by the current frame variance estimation value. The online target signal extraction apparatus 20 according to the present invention may generate the current frame steering vector C_HV by calculating the current frame noise covariance based on the current frame variance estimation value determined according to the current frame output results C_OR corresponding to the current frame input results C_XS, and increase extraction performance for a target sound source by updating the current frame beamforming weight C_BFW.

Figure 10:
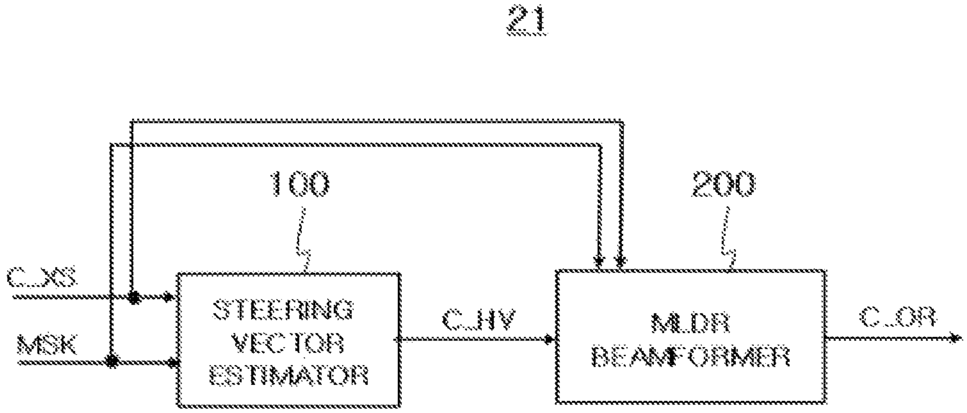
FIG. 10 is a diagram illustrating an online target signal extraction system according to embodiments of the present invention.
Figure 11:
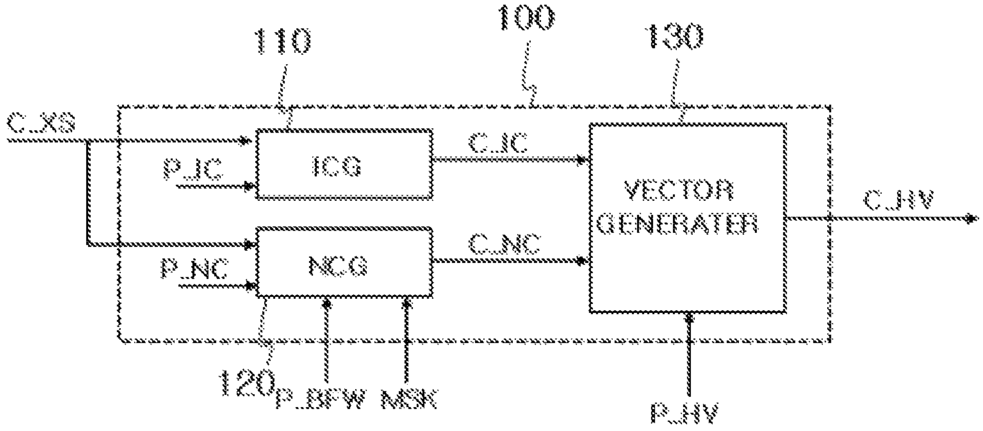
FIG. 11 is a diagram illustrating an example of a steering vector estimator included in the online target signal extraction system of FIG. 10.
Figure 12:
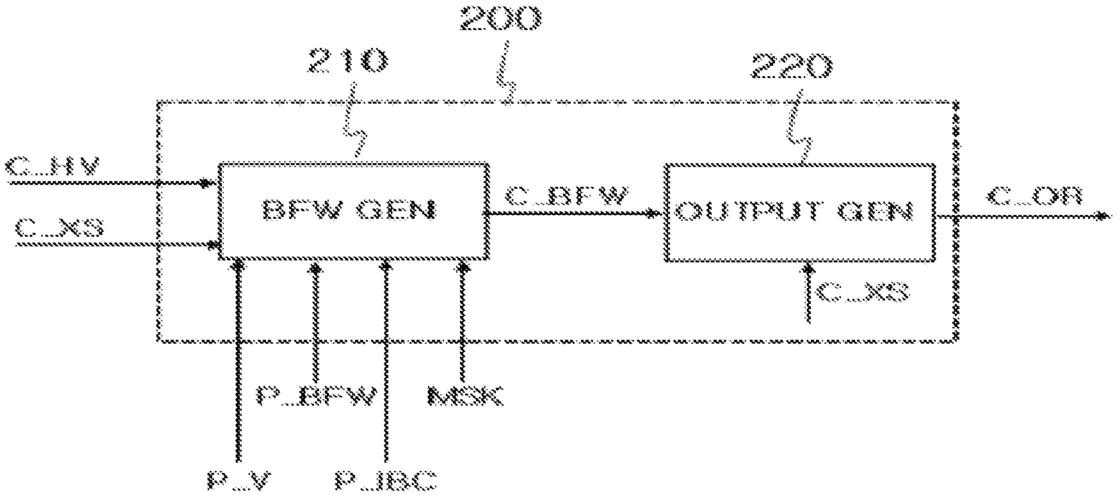
FIG. 12 is a diagram illustrating an example of a beamformer included in the online target signal extraction system of FIG. 10.

FIGS. 10 to 12 are diagrams illustrating an online target signal extraction system according to embodiments of the present invention, FIG. 11 is a diagram illustrating an example of a steering vector estimator included in the online target signal extraction system of FIG. 10, and FIG. 12 is a diagram illustrating an example of a beamformer included in the online target signal extraction system of FIG. 10.

Referring to FIGS. 10 to 12, an online target signal extraction system 21 may include the steering vector estimator 100 and the beamformer 200. The steering vector estimator 100 may include the input signal covariance generator 110, the noise covariance generator 120, and the vector generator 130. The steering vector estimator 100 may generate the current frame input signal covariance C_IC generated based on the previous frame input signal covariance P_IC corresponding to a previous frame and the current frame input results C_XS for each frequency according to a current frame, may generate the current frame noise covariance C_NC based on the previous frame noise covariance P_NC corresponding to the previous frame, the current frame input results C_XS, and the current frame variance estimation value generated through a predetermined mask, and may generate the current frame steering vector C_HV based on the current frame input signal covariance C_IC, the current frame noise covariance C_NC, and the previous frame steering vector P_HV.

The beamformer 200 may generate a current frame beamforming variance estimation value according to the previous frame beamforming weight P_BFW, the current frame input results C_XS, previous frame variance, and a predetermined mask, may generate the current frame beamforming inverse covariance C_IBC determined according to the previous frame inverse covariance P_IBC, the current frame input results C_XS, and the current frame beamforming variance estimation value, may generate the current frame beamforming weight C_BFW according to the current frame steering vector C_HV and the current frame beamforming inverse covariance C_IBC, and may provide the current frame output results C_OR based on the current frame input results C_XS and the current frame beamforming weight C_BFW.

Contents of [Equation 11] and [Equation 13] to [Equation 15] described with reference to FIGS. 7 to 9 may be equally applied to the online target signal extraction system 21 according to the present invention.

In an embodiment, the current frame noise covariance C_NC may be generated based on the previous frame noise covariance P_NC, the current frame input results C_XS, and the current frame variance estimation value generated through the predetermined mask. For example, the current frame noise covariance C_NC may be expressed as [Equation 17] below.

[Equation 17]

$$R_{l,k}^{\dot{n}} = \frac{\sum_{m=1}^{l-1} \gamma^{l-m}\left(1/\hat{\lambda}_{l,k}\right)}{\sum_{m=1}^{l} \gamma^{l-m}\left(1/\hat{\lambda}_{l,k}\right)} R_{l-1,k}^{\dot{n}} + \frac{1}{\sum_{m=1}^{l} \gamma^{l-m}\left(1/\hat{\lambda}_{l,k}\right)} \left(\frac{\hat{x}_{l,k}\hat{x}_{l,k}^H}{\hat{\lambda}_{l,k}}\right)$$

$$\hat{x}_{l,k} = \left(1 - \overline{M}_{l,k}\right)x_{l,k} \quad \lambda_{l,k} = \max\left(\left|\overline{M}_{l,k} X_{l,k}\right|^2, \varepsilon'_k\right)$$

Here, $R_{l,k}^{\hat{n}}$ may be a current frame noise covariance, $\overline{M}_{l,k}$ may be a mask, $\gamma^{l-m}$ may be a forgetting factor, $R_{l-1,k}^{\hat{n}}$ may be a previous frame noise covariance, $\hat{\lambda}_{l,k}$ may be a current frame variance estimate, $X_{l,k}$ may be a component of current frame input results, and $\hat{\varepsilon}'_k$ may be a third constant value.

In an embodiment, the current frame beamforming variance estimation value may be generated based on the previous frame beamforming weight P_BFW, the current frame input results C_XS, the previous frame variance P_V, and the predetermined mask. For example, the current frame beamforming variance estimation value may be expressed as [Equation 18] below.

$$|\tilde{Y}_{l,k}|^2 = \eta|\overline{M}_{l,k} X_{l,k}|^2 + (1-\eta)|w_{l-1,k}^H x_{l,k}|^2 \quad \tilde{\lambda}_{l,k} = \max(\beta\lambda_{l-1,k} + (1-\beta)|\tilde{Y}_{l,k}|^2, \varepsilon'_k)$$ [Equation 18]

Here, $\tilde{Y}_{l,k}$ may be the current frame estimation output results, $w_{l-1,k}^H$ may be a previous frame beamforming weight, $x_{l,k}$ may be current frame input results, $\overline{M}_{l,k}$ may be a mask, $\tilde{\lambda}_{l,k}$ may be a current frame beamforming variance estimation value, $\lambda_{l-1,k}$ may be a previous frame variance, $\beta$, may be a weight, and $\varepsilon'_k$ may be a fourth constant value.

Figure 13:
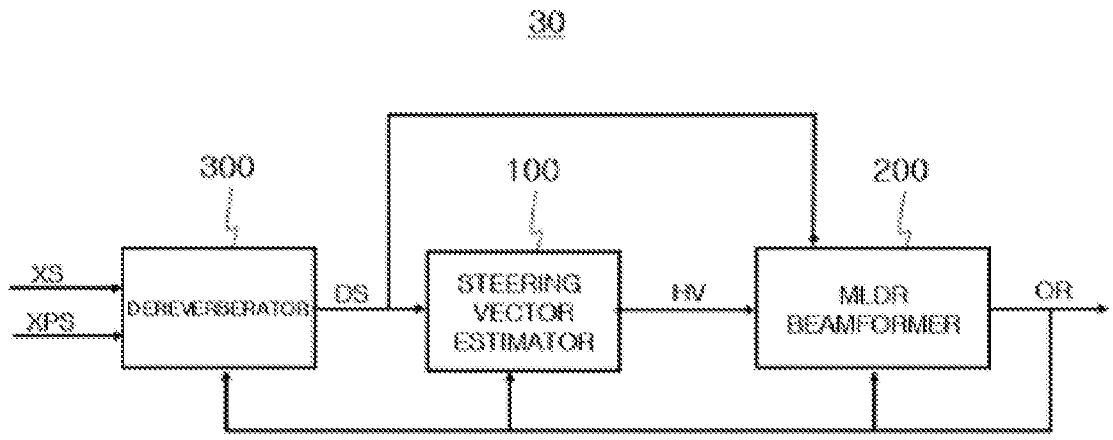
FIG. 13 is a diagram illustrating an example of a target signal extraction apparatus according to embodiments of the present invention.
Figure 14:
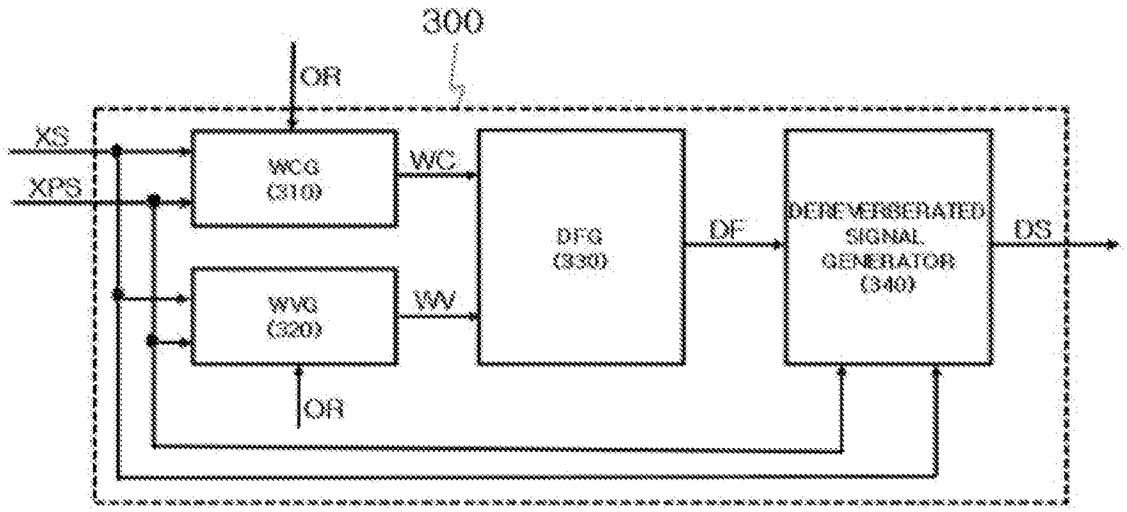
FIG. 14 is a diagram illustrating an example of a dereverberator included in the target signal extraction apparatus of FIG. 13.
Figure 15:
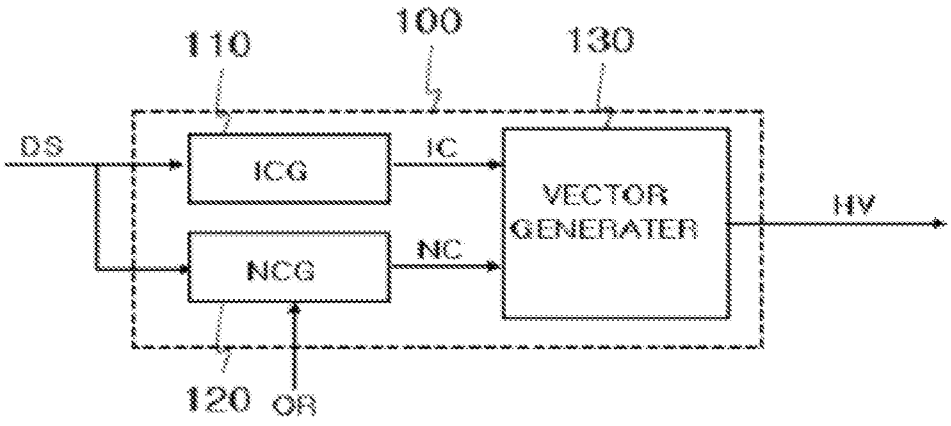
FIG. 15 is a diagram illustrating an example of a steering vector estimator included in the target signal extraction apparatus of FIG. 13.
Figure 16:
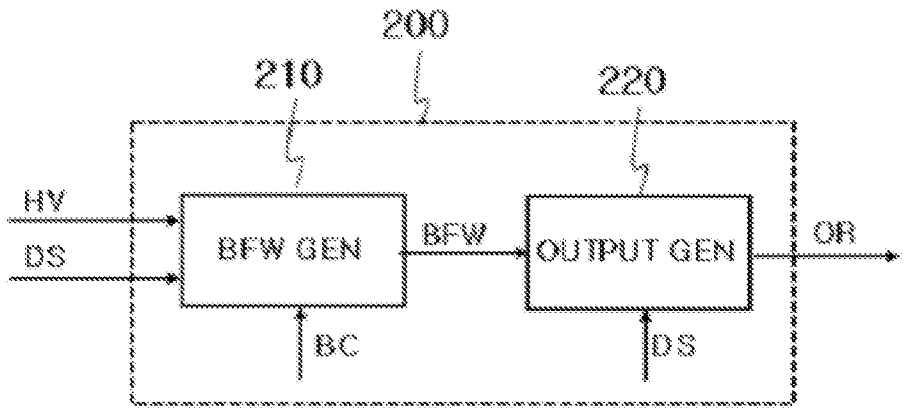
FIG. 16 is a diagram illustrating an example of a beamformer included in the target signal extraction apparatus of FIG. 13.

FIGS. 13 to 16 are diagrams illustrating examples of a target signal extraction apparatus according to embodiments of the present invention, FIG. 14 is a diagram illustrating an example of a dereverberator included in the target signal extraction apparatus of FIG. 13, FIG. 15 is a diagram illustrating an example of a steering vector estimator included in the target signal extraction apparatus of FIG. 13, and FIG. 16 is a diagram illustrating an example of a beamformer included in the target signal extraction apparatus of FIG. 13.

Referring to FIGS. 13 to 16, a target signal extraction apparatus 30 according to an embodiment of the present invention may include a dereverberator 300, the steering vector estimator 100, and the beamformer 200. The dereverberator 300 may include a weighted covariance generator 310, a weighted correlation vector generator 320, a dereverberated filter generator 330, and a dereverberated signal generator 340. The dereverberator 300 may generate a weighted covariance WC based on a variance determined according to past input results XPS for each frequency over time and the output results OR corresponding to dereverberated input results DS, may generate a weighted correlation vector WV based on the input results XS for each frequency over time, the past input results XPS, and the output results OR corresponding to the dereverberated input results DS, may generate a dereverberated filter DF based on the weighted covariance WC and the weighted correlation vector WV, and may generate the dereverberated input results DS based on the input results XS, the past input results XPS, and the dereverberated filter DF.

For example, the weighted covariance generator 310 may generate the weighted covariance WC according to the past input results XPS and the variance.

The weighted covariance WC may be expressed as [Equation 19] below.

[Equation 19]

$$R_k^x = \sum_{l=1}^{N_l}\left(\frac{\overline{x}_{l,k}\overline{x}_{l,k}^H}{\max(\lambda_{l,k}, \varepsilon_k)}\right),$$

$$\overline{x}_{l,k} = \left[x_{l-b,k}^T, \Lambda, x_{l-L-b+1,k}^T\right]^T$$

Here, $R_k^x$ may be a weighted covariance, $\overline{x}_{l,k}$ may be past input results, $\lambda_{l,k}$ may be a variance, b may be the number of delayed frames, L may be the number of taps, and $\varepsilon_k$ may be a second constant value.

Also, the weighted correlation vector generator 320 may generate the weighted correlation vector WV according to the input results XS for each frequency over time, the past input results, and the variance.

The weighted correlation vector WV may be expressed as [Equation 20] below.

[Equation 20]

$$P_k = \sum_{l=1}^{N_k}\left(\frac{\overline{x}_{l,k}x_{l,k}^H}{\max(\lambda_{l,k}, \varepsilon_k)}\right)$$

Here, $P_k$ may be a weighted correlation vector, and $x_{l,k}^H$ may be current frame input results.

Also, the dereverberated filter generator 330 may generate the dereverberated filter DF based on the weighted covariance WC and the weighted correlation vector WV.

The dereverberated filter DF may be expressed as [Equation 21] below.

$$G_k = (R_k^{\overline{x}})^{-1} P_k$$ [Equation 21]

Here, $G_k$ may be a dereverberated filter.

Also, the dereverberated signal generator 340 may generate dereverberated input results DS based on the input results XS, the past input results XPS, and the dereverberated filter DF.

The dereverberated input results DS may be expressed as [Equation 22] below.

$$d_{l,k}=x_{l,k}-G_k^H\tilde{x}_{l,k} \quad \text{[Equation 22]}$$

Here, $d_{l,k}$ may be dereverberated input results.

The steering vector estimator 100 may generate the input signal covariance IC according to the dereverberated input results DS, may generate the noise covariance NC based on the variance determined according to the output results OR corresponding to the input results XS, and may generate the steering vector HV based on the input signal covariance IC and the noise covariance NC.

For example, the input signal covariance generator 110 may generate the input signal covariance IC according to the dereverberated input results DS.

The input signal covariance IC may be expressed as [Equation 23] below.

$$R_k^x = \frac{1}{N_k}\sum_{l=1}^{N_k}\left(d_{l,k}d_{l,k}^H\right) \quad \text{[Equation 23]}$$

Here, $R_k^x$ may be an input signal covariance, $N_k$ may be the number of frames, l may be a frame index, k may be a frequency index, and $d_{l,k}$ may be dereverberated input results.

Also, the noise covariance generator 120 may generate the noise covariance NC based on a variance determined according to the output results OR corresponding to the dereverberated input results DS.

The noise covariance NC may be expressed as [Equation 24] below.

$$R_k^{\hat{n}} = \frac{1}{\sum_{l-1}^{N_k} 1/\max(\lambda_{l,k}\hat{\varepsilon}_k)}\sum_{l-1}^{N_k}\left(\frac{d_{l,k}d_{l,k}^H}{\max(\lambda_{l,k}\hat{\varepsilon}_k)}\right) \quad \text{[Equation 24]}$$

Here, $R_k^{\hat{n}}$ may be a noise covariance, $\lambda_{l,k}$ may be a variance, $\hat{\delta}_k$ may be a first constant value, $N_k$ may be the number of frames, l may be a frame index, k may be a frequency index, and $d_{l,k}$ may be dereverberated input results.

Also, the vector generator 130 may generate the steering vector HV based on the input signal covariance IC and the noise covariance NC. For example, contents of [Equation 3] described with reference to FIGS. 1 to 3 may be equally applied to the steering vector HV.

The beamformer 200 may generate the beamforming weight BFW according to the dereverberated input results DS, a beamforming covariance BS determined according to the variance, and the steering vector HV, and provide the output results OR based on the dereverberated input results DS and the beamforming weight BFW.

For example, the beamformer 200 may include the beamforming weight generator 210 and the output generator 220. The beamforming weight generator 210 may generate the beamforming weight BFW according to the dereverberated input results DS, the beamforming covariance BS determined according to the variance, and the steering vector HV.

The beamforming covariance BC may be expressed as [Equation 25] below.

$$R_k^{\tilde{d}} = \sum_{l=1}^{N_k}\left(\frac{d_{l,k}d_{l,k}^H}{\max(\lambda_{l,k}\varepsilon_k)}\right) \quad \text{[Equation 25]}$$

Here, $R_k^{\tilde{d}}$ may be a beamforming covariance, and $\varepsilon_k$ may be a second constant value.

The beamforming weight BFW may be expressed as [Equation 26] below.

$$w_k = \frac{\left(R_k^{\tilde{d}} + \delta_k I\right)^{-1} h_k}{h_k^H\left(R_k^{\tilde{d}} + \delta_k I\right)^{-1} h_k} \quad \text{[Equation 26]}$$

Here, $w_k$ may be a beamforming weight, $\delta_k$ may be a diagonal loading constant value, and I may be an identity matrix.

The output generator 220 may provide the output results OR based on the dereverberated input results DS and the beamforming weight BFW.

The output results OR may be expressed as [Equation 27] below.

$$Y_{l,k}=w_k^H d_{l,k}, \lambda_{l,k}=|Y_{l,k}|^2 \quad \text{[Equation 27]}$$

Here, $Y_{l,k}$ may be output results, and $\lambda_{l,k}$ may be a variance.

In an embodiment, the weighted covariance WC, the weighted correlation vector WV, the noise covariance NC, and the beamforming covariance BC may be determined based on the output results OR. For example, contents of [Equation 7] described with reference to FIGS. 1 to 3 may be equally applied to the variance used in each of the weighted covariance WC and the weighted correlation vector WV.

In an embodiment, initial values of the weighted covariance WC and the weighted correlation vector WV may be determined based on the input results XS. For example, the initial value of the variance used in each of the weighted covariance WC and the weighted correlation vector WV may be expressed as [Equation 28] below.

$$\lambda_{l,k} \leftarrow \frac{1}{2\tau+1}\sum_{m=l-\tau}^{l+\tau}\frac{x_{m,k}^H x_{m,k}}{M} \quad \text{[Equation 28]}$$

Here, τ may be the number of adjacent frames, M may be the number of channels of input results, and m may be a frame index.

In an embodiment, the weighted covariance WC and the weighted correlation vector WV may be determined according to a larger value between a variance and a second constant value.

In an embodiment, initial values of the noise covariance NC and the beamforming covariance BC may be determined based on the dereverberated input results DS. For example, an initial value of the variance used in each of the noise covariance NC and the beamforming covariance BC may be expressed as [Equation 29] below.

$$\lambda_{l,k} \leftarrow \frac{d_{l,k}^H d_{l,k}}{M},\ \lambda_{l,k} \leftarrow \frac{1}{2\tau+1}\sum_{m=l-\tau}^{l+\tau}\frac{d_{m,k}^H d_{m,k}}{M} \quad \text{[Equation 29]}$$

Here, $d_{l,k}$ and $d_{m,k}$ may be dereverberated input results, and τ may be the number of adjacent frames.

In an embodiment, the noise covariance NC may be determined according to a larger value between a variance and a first constant value. Also, the noise covariance NC may be normalized according the larger value between the variance and the first constant value.

In an embodiment, the beamforming covariance BC may be determined according to a larger value between a variance and a second constant value.

In an embodiment, the target signal extraction apparatus 30 may repeatedly operate the dereverberator 300, the steering vector estimator 100, and the beamformer 200 until the dereverberated filter DF and the beamforming weight BFW converge. The target signal extraction apparatus 30 may repeat an operation of generating the dereverberated input results DS through the dereverberator 300, and generating the steering vector HV through the steering vector estimator 100, and then generating the beamforming weight BFW through the beamformer 200. The target signal extraction apparatus 30 according to the present invention may generate the dereverberated input results DS by calculating the weighted covariance WC based on the variance determined according to the output results OR corresponding to the input results XS and the dereverberated filter DF through the weighted correlation vector WV, may generate the steering vector HV by calculating the noise covariance NC, and may increase extraction performance for a target sound source by updating the beamforming weight BFW.

Figure 17:
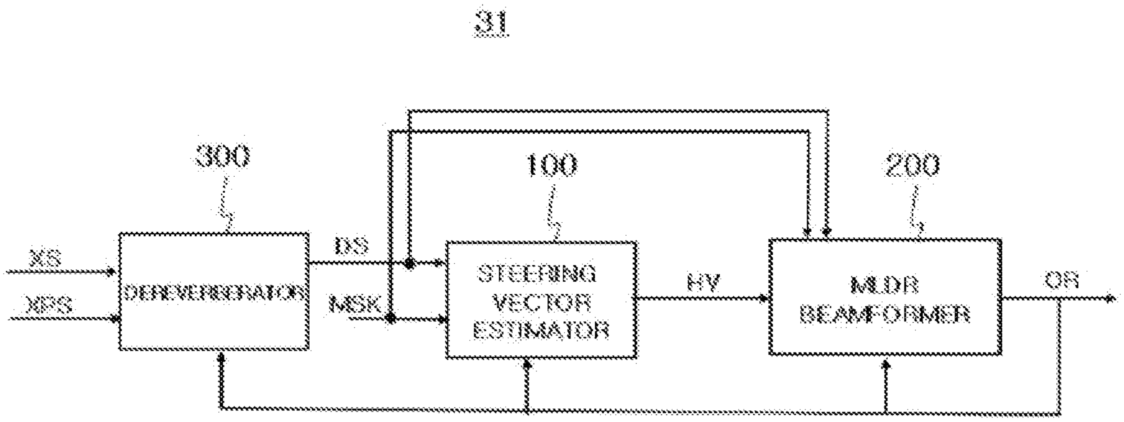
FIG. 17 is a diagram illustrating an example of a target signal extraction system according to embodiments of the present invention.
Figure 18:
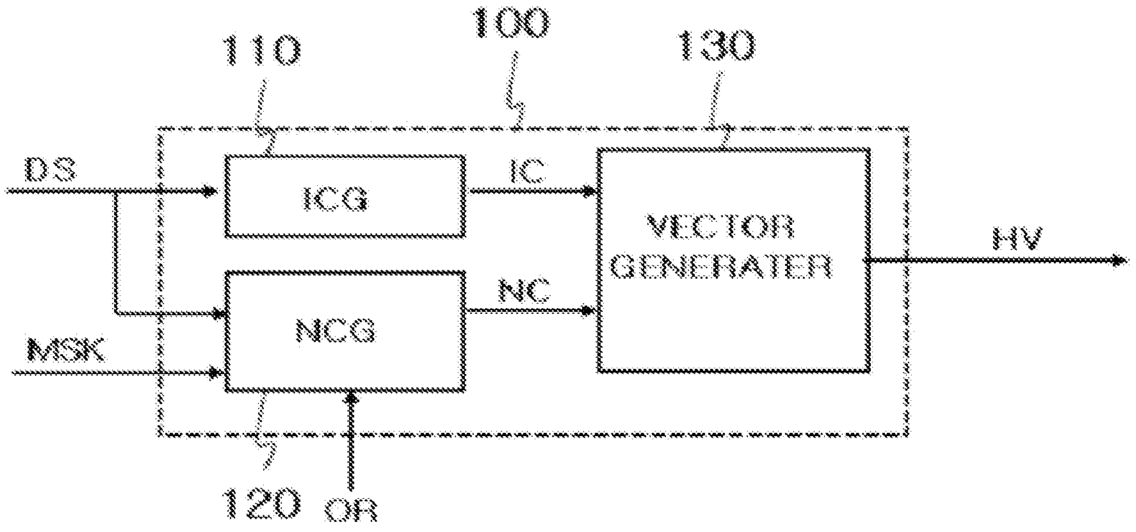
FIG. 18 is a diagram illustrating an example of a steering vector estimator included in the target signal extraction system of FIG. 17.
Figure 19:
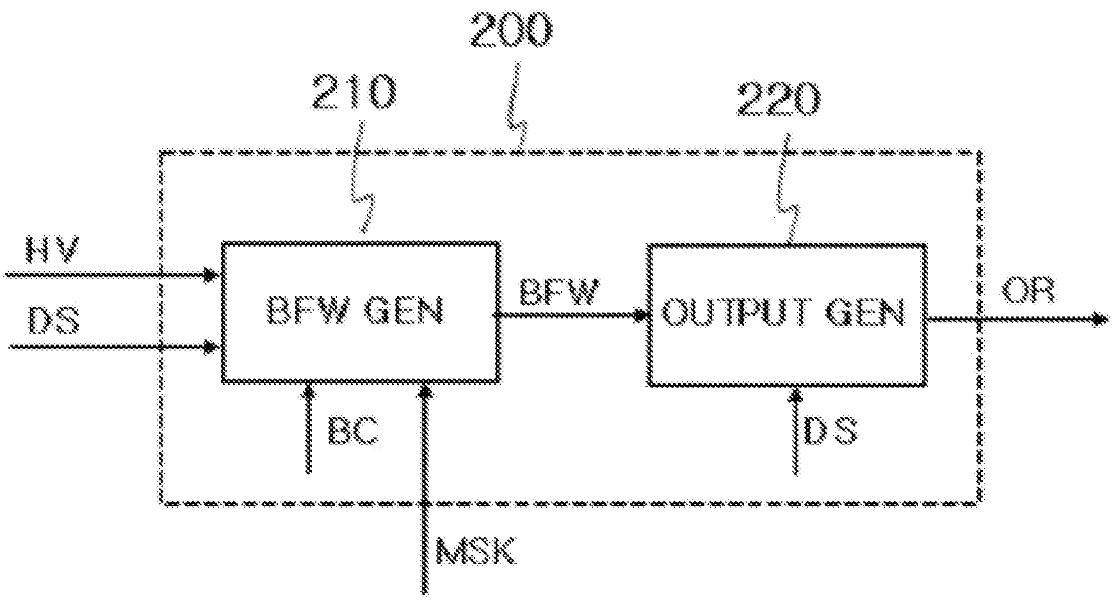
FIG. 19 is a diagram illustrating an example of a beamformer included in the target signal extraction system of FIG. 17.

FIGS. 17 to 19 are diagrams illustrating examples of a target signal extraction system according to embodiments of the present invention, FIG. 18 is a diagram illustrating an example of a steering vector estimator included in the target signal extraction system of FIG. 17, and FIG. 19 is a diagram illustrating an example of a beamformer included in the target signal extraction system of FIG. 17.

Referring to FIGS. 17 to 19, a target signal extraction system 31 according to an embodiment of the present invention may include the dereverberator 300, the steering vector estimator 100, and the beamformer 200. The dereverberator 300 may include the weighted covariance generator 310, the weighted correlation vector generator 320, the dereverberated filter generator 330, and the dereverberated signal generator 340. The dereverberator 300 may generate a weighted covariance WC based on a variance determined according to past input results XPS for each frequency over time and the output results OR corresponding to dereverberated input results DS, may generate a weighted correlation vector WV based on the input results XS for each frequency over time, the past input results XPS, and the output results OR corresponding to the dereverberated input results DS, may generate a dereverberated filter DF based on the weighted covariance WC and the weighted correlation vector WV, and may generate the dereverberated input results DS based on the input results XS, the past input results XPS, and the dereverberated filter DF. The steering vector estimator 100 may generate the input signal covariance IC according to the dereverberated input results DS for each frequency over time, may generate the noise covariance NC based on the variance determined according to the output results OR corresponding to the dereverberated input results DS and a predetermined mask MSK, and may generate the steering vector HV based on the input signal covariance IC and the noise covariance NC. The beamformer 200 may generate the beamforming weight BFW according to the dereverberated input results DS, the beamforming covariance BS determined according to the variance, and the steering vector HV, and provide the output results OR based on the dereverberated input results DS and the beamforming weight BFW.

Contents of [Equation 19] to [Equation 23] and [Equation 25] to [Equation 27] described with reference to FIGS. 13 to 16 may be equally applied to the target signal extraction system 31 according to the present invention.

In an embodiment, initial values of the noise covariance NC and the beamforming covariance BC may be determined according to a product of the dereverberated input results DS and the mask MSK. For example, an initial value of the variance used in each of the noise covariance NC and the beamforming covariance BC may be expressed as [Equation 30] below.

$$\lambda_{l,k} = \frac{\|\overline{M}_{l,k}d_{l,k}\|_2^2}{M},\ \lambda_{l,k} = \frac{1}{2\tau+1}\sum_{m-l-\tau}^{l+\tau}\frac{\|\overline{M}_{m,k}d_{m,k}\|_2^2}{M} \quad \text{[Equation 30]}$$

Here, $\overline{M}_{l,k}$ may be a mask, $d_{l,k}$ may be dereverberated input results, and M may be the number of channels of input results.

In an embodiment, the dereverberated input results DS of the noise covariance NC may be updated as a product of the dereverberated input results DS and the mask MSK. For example, the dereverberated input results DS used in the noise covariance NC may be updated as [Equation 31] below.

$$d_{l,k} \leftarrow (1-\overline{M}_{l,k})d_{l,k} \quad \text{[Equation 31]}$$

Here, $\overline{M}_{l,k}$ may be a mask.

In an embodiment, the mask MSK may be calculated for each frame index and frequency index. For example, a mask for each frame index and frequency index may be calculated based on a neural network or diffuseness.

In an embodiment, the noise covariance NC may be determined according to a larger value between a variance and a first constant value, and the noise covariance NC may be normalized according to the larger value between the variance and the first constant value.

In an embodiment, the beamforming covariance BC may be determined according to a larger value between the variance and a second constant value, and the target signal extraction system 31 may repeatedly operate the dereverberator 300, the steering vector estimator 100, and the beamformer 200 until the dereverberated filter DF and the beamforming weight BFW converge.

Figure 20:
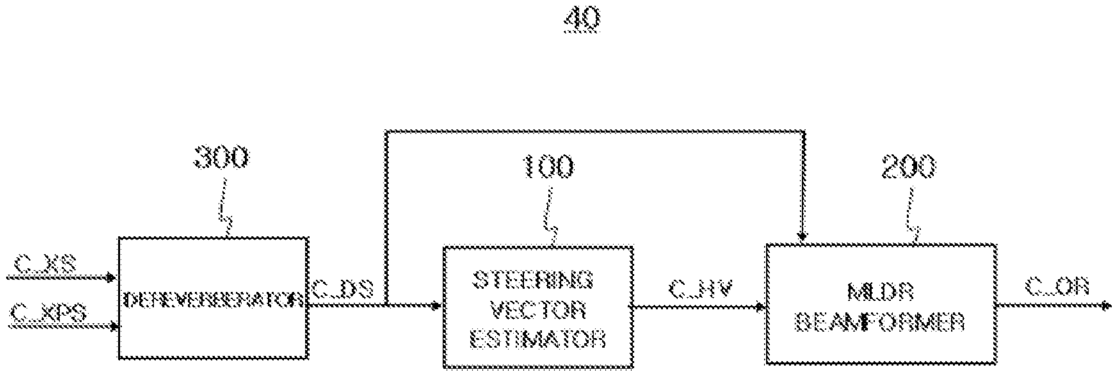
FIG. 20 is a diagram illustrating an example of an online target signal extraction apparatus according to embodiments of the present invention.
Figure 21:
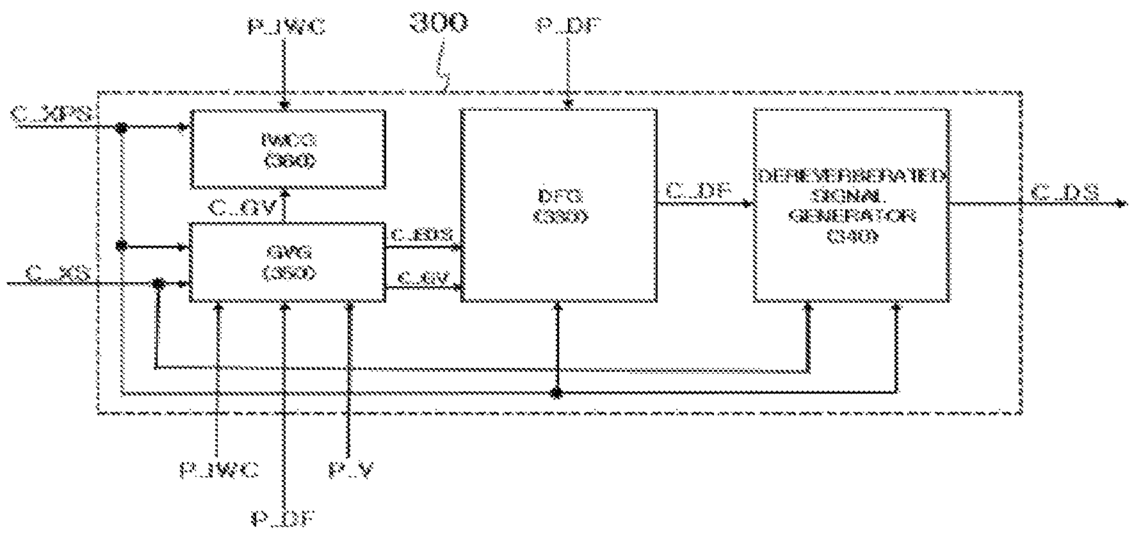
FIG. 21 is a diagram illustrating an example of a dereverberator included in the online target signal extraction apparatus of FIG. 20.
Figure 22:
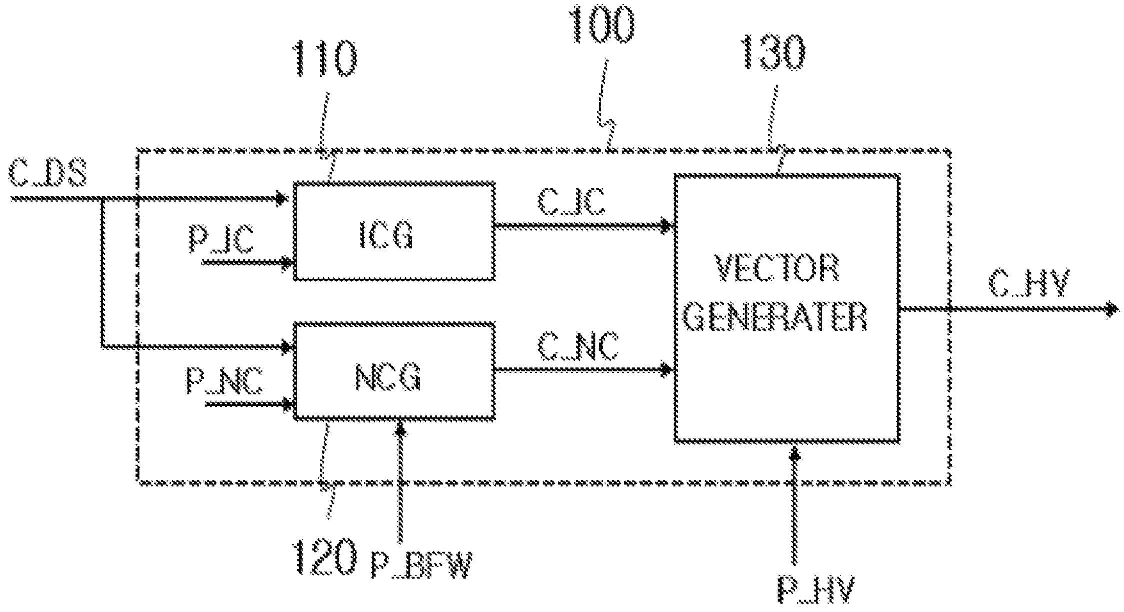
FIG. 22 is a diagram illustrating an example of a steering vector estimator included in the online target signal extraction apparatus of FIG. 20.
Figure 23:
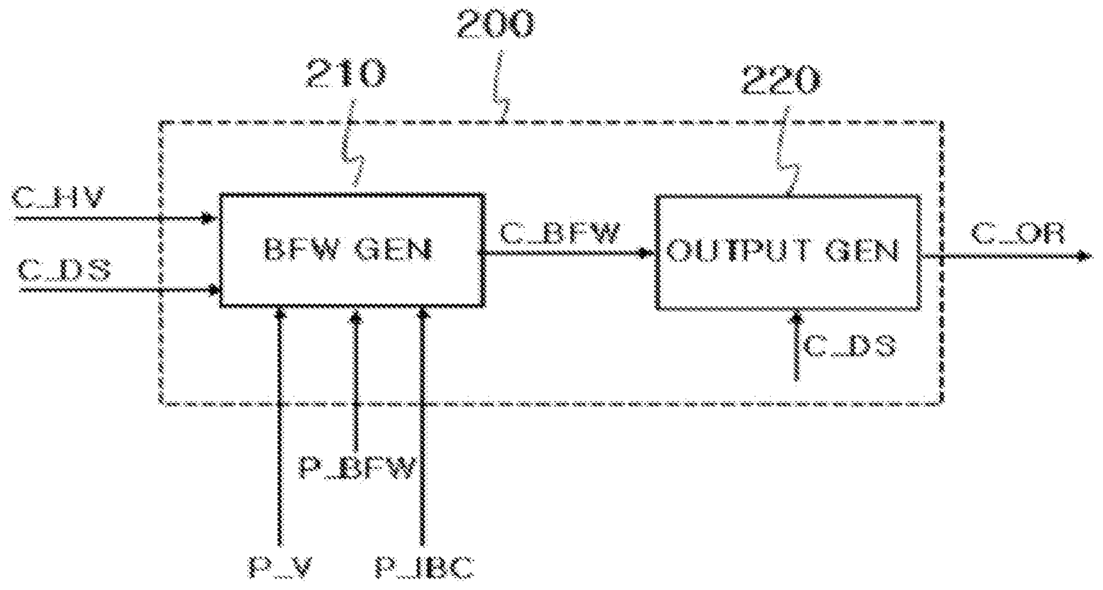
FIG. 23 is a diagram illustrating an example of a beamformer included in the online target signal extraction apparatus of FIG. 20.

FIGS. 20 to 23 are diagrams illustrating examples of an online target signal extraction apparatus according to embodiments of the present invention, FIG. 21 is a diagram illustrating an example of a dereverberator included in the online target signal extraction apparatus of FIG. 20, FIG. 22 is a diagram illustrating an example of a steering vector estimator included in the online target signal extraction apparatus of FIG. 20, and FIG. 23 is a diagram illustrating an example of a beamformer included in the online target signal extraction apparatus of FIG. 20.

Referring to FIGS. 20 to 23, an online target signal extraction apparatus 40 according to an embodiment of the present invention may include the dereverberator 300, the steering vector estimator 100, and the beamformer 200. The dereverberator 300 may include the gain vector generator 350, a weighted inverse covariance generator 360, the dereverberated filter generator 330, and the dereverberated signal generator 340.

The dereverberator 300 may generate a current frame dereverberated output estimation value C_EDS based on the current frame input results C_XS corresponding to a current frame, current frame past input results C_XPS, and a previous frame dereverberated filter P_DF corresponding to a previous frame, may generate a current frame dereverberated variance estimation value based on the previous frame variance P_V corresponding to the previous frame and the current frame dereverberated output estimation value C_EDS, may generate a current frame gain vector C_GV based on a previous frame weighted inverse covariance P_IWC corresponding to the previous frame, the current frame dereverberated output estimation value C_EDS, and the current frame past input results C_XPS, may generate a current frame weighted inverse covariance C_IWC based on the previous frame weighted inverse covariance P_IWC, the current frame past input results C_XPS, and the current frame gain vector C_GV, may generate a current frame dereverberated filter C_DF corresponding to the current frame based on the current frame gain vector C_GV, the current frame past input results C_XPS, and the previous frame dereverberated filter P_DF corresponding to the previous frame, and may generate current frame dereverberated input results C_DS based on the current frame input results C_XS, the current frame past input results C_XPS, and the current frame dereverberated filter C_DF.

For example, the gain vector generator 350 may generate the current frame dereverberated output estimation value C_EDS based on the current frame input results C_XS, the current frame past input results C_XPS, and the previous frame dereverberated filter P_DF.

The current frame dereverberated output estimation value C_EDS may be expressed as [Equation 32] below.

$$\acute{d}_{l,k}=x_{l,k}-G_{l-1,k}^{H}\bar{x}_{l,k} \quad \text{[Equation 32]}$$

Here, $\acute{d}_{l,k}$ may be a current frame dereverberated output estimation value, $x_{l,k}$ may be current frame input results, $G_{l-1,k}^{H}$ may be a previous frame dereverberated filter, and $\bar{x}_{l,k}$ may be current frame past input results.

In addition, the gain vector generator 350 may generate a current frame dereverberated variance estimation value based on the previous frame variance P_V and the current frame dereverberated output estimation value C_EDS.

The current frame dereverberated variance estimation value may be expressed as [Equation 33] below.

$$\breve{\lambda}_{l,k}=\max\left(\beta\lambda_{l-1,k}+(1-\beta)\left(\frac{\breve{d}_{l,k}^{H}\breve{d}_{l,k}}{M}\right),\ \varepsilon'_k\right) \quad \text{[Equation 33]}$$

Here, $\acute{\lambda}_{l,k}$ may be a current frame dereverberated variance estimation value, $\lambda_{l-1,k}$ may be a previous frame variance, $\beta$ may be a weight, and $\varepsilon'_k$ may be a fourth constant value.

Also, the gain vector generator 350 may generate the current frame gain vector C_GV based on the previous frame weighted inverse covariance P_IWC, the current frame past input results C_XPS, and the current frame variance estimation value.

The current frame gain vector C_GV may be expressed as [Equation 34] below.

$$k_{l,k}=\frac{\Phi_{l-1,k}\bar{x}_{l,k}}{\gamma\breve{\lambda}_{l,k}+\bar{x}_{l,k}^{H}\Phi_{l-1,k}\bar{x}_{l,k}} \quad \text{[Equation 34]}$$

Here, $k_{l,k}$ may be a current frame gain vector, $\Phi_{l-1,k}$ may be a previous frame weighted inverse covariance P_IWC, and $\bar{x}_{l,k}$ may be current frame past input results.

The weighted inverse covariance generator 360 may generate the current frame weighted inverse covariance C_IWC based on the previous frame weighted inverse covariance P_IWC, the current frame past input results P_XPS, and the current frame gain vector C_GV.

The current frame weighted inverse covariance C_IWC may be expressed as [Equation 35] below.

$$\Phi_{l,k}=\gamma^{-1}(\Phi_{l-1,k}-k_{l,k}\bar{x}_{l,k}^{H}\Phi_{l-1,k}) \quad \text{[Equation 35]}$$

Here, $\Phi_{l,k}$ may be a current frame weighted inverse covariance, $\bar{x}_{l,k}^{H}$ may be current frame past input results, and ´ may be a forgetting factor.

The dereverberated filter generator 330 may generate the current frame dereverberated filter C_DF based on the previous frame dereverberated filter P_DF, the current frame dereverberated output estimation value C_EDS, and the current frame past input results C_XPS.

The current frame dereverberated filter C_DF may be expressed as [Equation 36] below.

$$G_{l,k}=G_{l-1,k}+k_{l,k}\acute{d}_{l,k}^{H} \quad \text{[Equation 36]}$$

Here, $G_{l,k}$ may be a current frame dereverberated filter, $G_{l-1,k}^{H}$ may be a previous frame dereverberated filter, $k_{l,k}$ may be a current frame gain vector, and $\acute{d}_{l,k}$ may be a current frame dereverberated output estimation value.

The dereverberated signal generator 340 may generate the current frame dereverberated input results C_DS based on the current frame input results C_XS, the current frame dereverberated filter C_DF, and the current frame past input results C_XPS.

The current frame dereverberated input results C_DS may be expressed as [Equation 37] below.

$$d_{l,k}=x_{l,k}-G_{l,k}^{H}\bar{x}_{l,k} \quad \text{[Equation 37]}$$

Here, $d_{l,k}$ may be current frame dereverberated input results, and $G_{l,k}^{H}$ may be a current frame dereverberated filter.

The steering vector estimator 100 may generate the current frame input signal covariance C_IC generated based on the previous frame input signal covariance P_IC corresponding to a previous frame and the current frame dereverberated input results C_DS for each frequency according to a current frame, may generate a current frame variance estimation value based on the current frame dereverberated input results C_DS and the previous frame beamforming weight P_BFW, may generate the current frame noise covariance C_NC based on the previous frame noise covariance P_NC corresponding to the previous frame and the current frame variance estimation value, and may generate the current frame steering vector C_HV based on the current frame input signal covariance C_IC, the current frame noise covariance C_NC, and the previous frame steering vector P_HV.

For example, the input signal covariance generator 110 may generate the current frame input signal covariance C_IC generated based on the previous frame input signal covariance P_IC corresponding to the previous frame and the current frame dereverberated input results C_DS for each frequency according to the current frame.

The current frame input signal covariance C_IC may be expressed as [Equation 38] below.

$$R_{l,k}^{x}=\frac{\sum_{m-1}^{l-1}\gamma^{l-m}}{\sum_{m-1}^{l}\gamma^{l-m}}R_{l-1,k}^{x}+\frac{d_{l,k}d_{l,k}^{H}}{\sum_{m-1}^{l}\gamma^{l-m}} \quad \text{[Equation 38]}$$

Here, $R_{l,k}^{x}$ may be a current frame input signal covariance, $R_{l-1,k}^{x}$ may be a previous frame input signal covariance, $\gamma^{l-m}$ may be a forgetting factor, l may be a frame index, k may be a frequency index, and $d_{l,k}$ may be current frame dereverberated input results.

In addition, the noise covariance generator 120 may generate the current frame noise covariance C_NC based on the previous frame noise covariance P_NC corresponding to the previous frame and the current frame variance estimation value generated according to the current frame dereverberated input results C_DS for each frequency and the previous frame beamforming weight P_BFW corresponding to the previous frame input results.

The current frame noise covariance C_NC may be expressed as [Equation 39] below.

[Equation 39]

$$R_{l,k}^{\hat{n}}=\frac{\sum_{m=1}^{l-1}\gamma^{l-m}\left(1/\hat{\lambda}_{l,k}\right)}{\sum_{m=1}^{l-1}\gamma^{l-m}\left(1/\hat{\lambda}_{l,k}\right)}R_{l-1,k}^{\hat{n}}+\frac{1}{\sum_{m=1}^{l}\gamma^{l-m}\left(1/\hat{\lambda}_{l,k}\right)}\left(\frac{d_{l,k}d_{l,k}^{H}}{\hat{\lambda}_{l,k}}\right),$$

$$\tilde{Y}_{l,k}=w_{l-1,k}^{H}d_{l,k}\ \ \hat{\lambda}_{i,k}=\max\left(|\tilde{Y}_{l,k}|^{2},\varepsilon'_{k}\right)$$

Here, $R_{l,k}^{\hat{n}}$ may be a current frame noise covariance, $\gamma^{l-m}$ may be a forgetting factor, $R_{l-1,k}^{\hat{n}}$ may be a previous frame noise covariance, $\hat{\lambda}_{l,k}$ may be a current frame variance estimation value, $\tilde{Y}_{l,k}$ may be current frame estimation output results, $w_{l-1,k}^{H}$ may be a previous frame beamforming weight, $d_{l,k}$ may be current frame dereverberated input results, and $\hat{\varepsilon}'_{k}$ may be a third constant value.

In addition, the vector generator 130 may generate the current frame steering vector C_HV based on the current frame input signal covariance C_IC and the current frame noise covariance C_NC, and contents of [Equation 13] described with reference to FIGS. 7 to 9 may be equally applied thereto.

The beamformer 200 may generate a current frame beamforming variance estimation value according to the previous frame beamforming weight P_BFW, the current frame dereverberated input results C_DS, and the previous frame variance P_V, may generate the current frame beamforming inverse covariance C_IBC based on the previous frame inverse covariance P_IBC, the current frame dereverberated input results C_DS, and the current frame beamforming variance estimation value, may generate the current frame beamforming weight C_BFW according to the current frame beamforming inverse covariance C_IBC and the current frame steering vector C_HV, and may provide the current frame output results C_OR based on the current frame dereverberated input results C_DS and the current frame beamforming weight C_BFW.

For example, the beamformer 200 may include the beamforming weight generator 210 and the output generator 220.

The beamforming weight generator 210 may generate a current frame beamforming variance estimation value according to the current frame dereverberated input results C_DS, the previous frame beamforming weight P_BFW, and the previous frame variance P_V, may generate the current frame beamforming inverse covariance C_IBC through the current frame dereverberated input results C_DS, the previous frame beamforming inverse covariance P_IBC, and the current frame beamforming variance estimation value, and may generate the current frame beamforming weight C_BFW according to the current frame beamforming inverse covariance C_IBC and the current frame steering vector C_HV.

Contents of [Equation 14] described with reference to FIGS. 7 to 9 may be equally applied to the current frame beamforming variance estimation value.

The current frame beamforming weight C_BFW may be expressed as [Equation 40] below.

$$w_{l,k}=\frac{\Psi_{l,k}h_{l,k}}{h_{l,k}^{H}\Psi_{l,k}h_{l,k}}, \quad \text{[Equation 40]}$$

$$\Psi_{l,k}=\gamma^{-1}\left(\Psi_{l-1,k}-\frac{\Psi_{l-1,k}d_{l,k}d_{l,k}^{H}\Psi_{l-1,k}}{\gamma\tilde{\lambda}_{l,k}+d_{l,k}^{H}\Psi_{l-1,k}d_{l,k}}\right)$$

Here, $w_{l,k}$ may be a current frame beamforming weight, $\Psi_{l-1,k}$ may be a previous frame beamforming inverse covariance, $h_{l,k}$ may be a current frame steering vector, $\Psi_{l,k}$ may be a current frame beamforming inverse covariance, and $d_{l,k}$ may be current frame dereverberated input results.

The output generator 220 may provide the current frame output results C_OR based on the current frame dereverberated input results C_DS and the current frame beamforming weight C_BFW.

The output results may be expressed as [Equation 41] below.

$$Y_{l,k}=w_{l,k}^{H}d_{l,k},$$

$$\lambda_{l,k}=\beta\lambda_{l-1,k}+(1-\beta)|Y_{l,k}|^{2} \quad \text{[Equation 41]}$$

Here, $Y_{l,k}$ may be current frame output results, $\lambda_{l,k}$ may be a current frame variance, and $d_{l,k}$ may be current frame dereverberated input results.

In an embodiment, the current frame noise covariance C_NC may be normalized by the current frame variance estimation value. The online target signal extraction apparatus 40 according to the present invention may generate the current frame gain vector C_GV based on the current frame variance estimation value determined according to the current frame output results C_OR corresponding to the current frame input results C_XS, may generate the current frame dereverberated input results C_DS by calculating the current frame dereverberated filter C_DF, may generate the current frame steering vector C_HV by calculating the current frame noise covariance C_NC, and may increase extraction performance for a target sound source by updating the current frame beamforming weight C_BFW.

Figure 24:
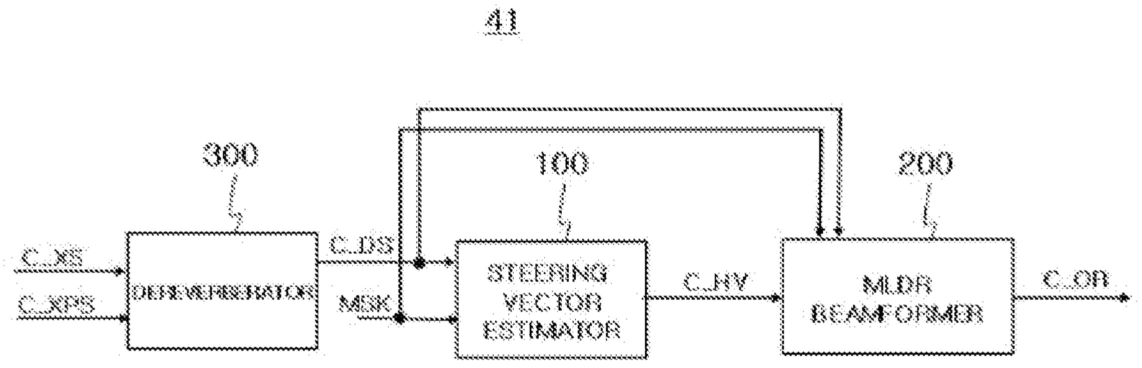
FIG. 24 is a diagram illustrating an online target signal extraction system according to embodiments of the present invention.
Figure 25:
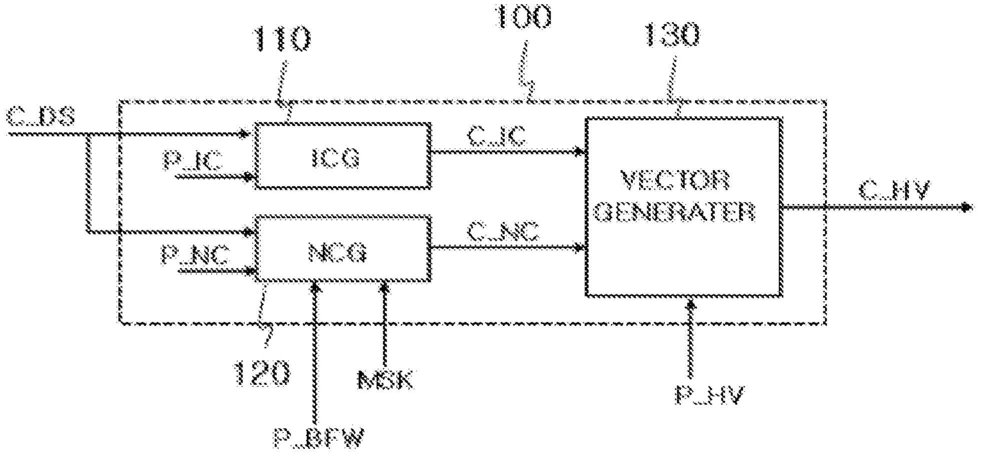
FIG. 25 is a diagram illustrating an example of a steering vector estimator included in the online target signal extraction system of FIG. 24.
Figure 26:
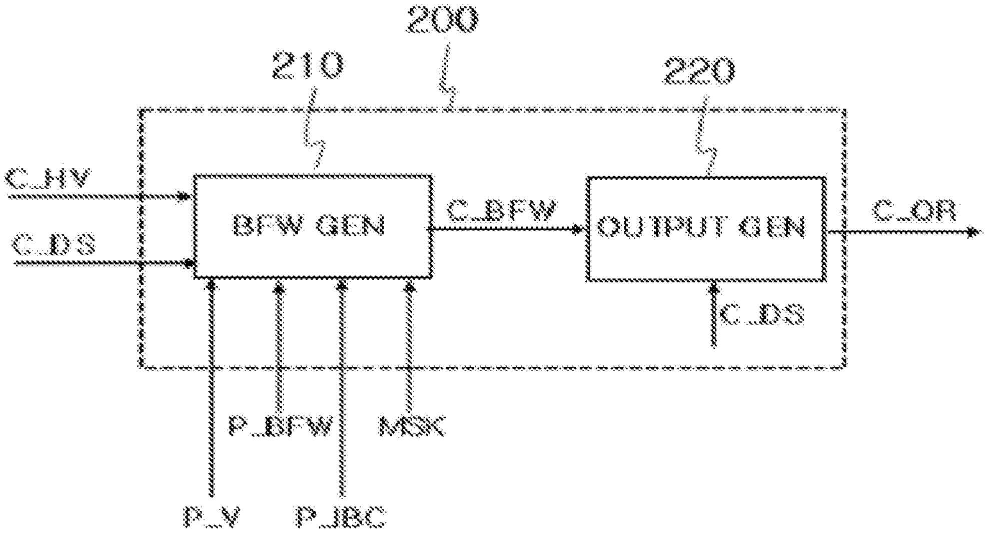
FIG. 26 is a diagram illustrating an example of a beamformer included in the online target signal extraction system of FIG. 24.

FIGS. 24 to 26 are diagrams illustrating an online target signal extraction system according to embodiments of the present invention, FIG. 25 is a diagram illustrating an example of a steering vector estimator included in the online target signal extraction system of FIG. 24, and FIG. 26 is a diagram illustrating an example of a beamformer included in the online target signal extraction system of FIG. 24.

Referring to FIGS. 20 to 26, an online target signal extraction system 41 according to an embodiment of the present invention may include the dereverberator 300, the steering vector estimator 100, and the beamformer 200. The dereverberator 300 may include the gain vector generator 350, the weighted inverse covariance generator 360, the dereverberated filter generator 330, and the dereverberated signal generator 340.

The dereverberator 300 may generate the current frame dereverberated output estimation value C_EDS based on the current frame input results C_XS corresponding to a current frame, the current frame past input results C_XPS, and the previous frame dereverberated filter P_DF corresponding to a previous frame, may generate a current frame dereverberated variance estimation value based on the previous frame variance P_V corresponding to the previous frame and the current frame dereverberated output estimation value C_EDS, may generate the current frame gain vector C_GV based on the previous frame weighted inverse covariance P_IWC corresponding to the previous frame, the current frame dereverberated output estimation value C_EDS, and the current frame past input results C_XPS, may generate the current frame weighted inverse covariance C_IWC based on the previous frame weighted inverse covariance P_IWC, the current frame past input results C_XPS, and the current frame gain vector C_GV, may generate the current frame dereverberated filter C_DF corresponding to the current frame based on the current frame gain vector C_GV, the current frame past input results C_XPS, and the previous frame dereverberated filter PDF corresponding to the previous frame, and may generate the current frame dereverberated input results C_DS based on the current frame input results C_XS, the current frame past input results C_XPS, and the current frame dereverberated filter C_DF.

The steering vector estimator 100 may generate the current frame input signal covariance C_IC generated based on the previous frame input signal covariance P_IC corresponding to a previous frame and the current frame dereverberated input results C_DS for each frequency according to a current frame, may generate the current frame noise covariance C_NC based on the previous frame noise covariance P_NC corresponding to the previous frame, the current frame dereverberated input results C_DS, and a current frame variance estimation value generated through a predetermined mask, and may generate the current frame steering vector C_HV based on the current frame input signal covariance C_IC, the current frame noise covariance C_NC, and the previous frame steering vector P_HV.

The beamformer 200 may generate the current frame beamforming variance estimation value according to the previous frame beamforming weight P_BFW, the current frame dereverberated input results C_DS, a previous frame variance, and the predetermined mask, may generate the current frame beamforming inverse covariance C_IBC according to the previous frame inverse covariance P_IBC, the current frame dereverberated input results C_DS, and the current frame beamforming variance estimation value, may generate the current frame beamforming weight C_BFW according to the current frame steering vector C_HV and the current frame beamforming inverse covariance C_IBC, and may provide the current frame output results C_OR based on the current frame dereverberated input results C_DS and the current frame beamforming weight C_BFW.

Contents of [Equation 13] to [Equation 14] described with reference to FIGS. 7 to 9 and [Equation 32] to [Equation 37] and [Equation 39] described with reference to FIGS. 20 to 23 may be equally applied to the target signal extraction system 41 according to the present invention.

In an embodiment, the current frame noise covariance C_NC may be generated based on the previous frame noise covariance P_NC, the current frame dereverberated input results C_DS, and the current frame variance estimation value generated through the predetermined mask. For example, the current frame noise covariance C_NC may be expressed as [Equation 42] below.

[Equation 42]

$$R^{\hat{n}}_{l,k} = \frac{\sum_{m=1}^{l-1} \gamma^{l-m}\left(1/\hat{\lambda}_{l,k}\right)}{\sum_{m-1}^{l} \gamma^{l-m}\left(1/\hat{\lambda}_{l,k}\right)} R^{\hat{n}}_{l-1,k} + \frac{1}{\sum_{m-1}^{l} \gamma^{l-m}\left(1/\hat{\lambda}_{l,k}\right)} \left(\frac{\hat{d}_{l,k}\hat{d}^{H}_{l,k}}{\hat{\lambda}_{l,k}}\right),$$

$$\hat{d}_{l,k} = \left(1 - \overline{M}_{l,k}\right) d_{l,k} \hat{\lambda}_{l,k} = \max\left(\left\|\overline{M}_{l,k} d_{l,k}\right\|_2^2 / M, \varepsilon'_k\right)$$

Here, $R_{l,k}{}^{\hat{n}}$ may be a current frame noise covariance, $\overline{M}_{l,k}$ may be a mask, $\gamma^{l-m}$ may be a forgetting factor, $R_{l-1,k}{}^{\hat{n}}$ may be a previous frame noise covariance, $\hat{\lambda}_{l,k}$ may be a current frame variance estimation value, $d_{l,k}$ may be current frame dereverberated input results, and $\hat{\varepsilon}'_k$ may be a third constant value.

In an embodiment, the current frame beamforming variance estimation value may be generated based on the previous frame beamforming weight P_BFW, the current frame dereverberated input results C_DS, the previous frame variance P_V, and the predetermined mask. For example, the current frame beamforming variance estimation value may be expressed as [Equation 43] below.

$$|\tilde{Y}_{l,k}|^2 = \eta(\|\overline{M}_{l,k} d_{l,k}\|_2{}^2/M) + (1-\eta)|w_{l-1,k}{}^H d_{l,k}|^2$$

$$\tilde{\lambda}_{l,k} = \max(\beta\lambda_{l-1,k} + (1-\beta)|\tilde{Y}_{l,k}|^2 \cdot \varepsilon'_k) \qquad \text{[Equation 43]}$$

Here, $\tilde{Y}_{l,k}$ may be current frame estimation output results, $w_{l-1,k}{}^H$ may be a previous frame beamforming weight, $d_{l,k}$ may be current frame dereverberated input results, $\overline{M}_{l,k}$ may be a mask, $\tilde{\lambda}_{l,k}$ may be a current frame beamforming variance estimation value, $\lambda_{l-1,k}$ may be a previous frame variance, $\beta$ may be a weight, and $\varepsilon'_\lambda$ may be a fourth constant value.

In addition to the technical problem of the present invention mentioned above, other features and advantages of the present invention will be described below or will be clearly understood by those of ordinary skill in the art from such description and explanation.

The invention claimed is:

1. A target signal extraction apparatus comprising:

a steering vector estimator generating an input signal covariance according to input results for each frequency over time, generating a noise covariance based on a variance determined according to output results corresponding to the input results, and generating a steering vector based on the input signal covariance and the noise covariance; and a beamformer generating a beamforming weight according to a beamforming covariance determined according to the variance and the steering vector, and providing the output results based on the input results and the beamforming weight.

2. The target signal extraction apparatus of claim 1, wherein initial values of the noise covariance and the beamforming covariance are determined based on the input results.

3. The target signal extraction apparatus of claim 2, wherein the noise covariance is determined according to a larger value between the variance and a first constant value.

4. The target signal extraction apparatus of claim 3, wherein the noise covariance is normalized according to a larger value between the variance and the first constant value.

5. The target signal extraction apparatus of claim 4, wherein the beamforming covariance is determined according to a larger value between the variance and a second constant value.

6. The target signal extraction apparatus of claim 5, wherein the target signal extraction apparatus repeatedly operates the steering vector estimator and the beamformer until the beamforming weight converges.

7. A target signal extraction system comprising:

a steering vector estimator generating an input signal covariance according to input results for each frequency over time, generating a noise covariance based on a variance determined according to output results corresponding to the input results and a predetermined mask, and generating a steering vector based on the input signal covariance and the noise covariance; and a beamformer generating a beamforming weight according to a beamforming covariance determined according to the variance and the steering vector, and providing the output results based on the input results and the beamforming weight.

8. The target signal extraction system of claim 7, wherein an initial value of the noise covariance is determined according to a product of the input results and the mask.

9. The target signal extraction system of claim 8, wherein the noise covariance is determined according to a larger value between the variance and a first constant value, and the noise covariance is normalized according to the larger value between the variance and the first constant value.

10. The target signal extraction system of claim 9, wherein the beamforming covariance is determined according to a larger value between the variance and a second constant value, and the target signal extraction apparatus repeatedly operates the steering vector estimator and the beamformer until the beamforming weight converges.

11. An online target signal extraction apparatus comprising:

a steering vector estimator generating a current frame input signal covariance generated based on a previous frame input signal covariance corresponding to a previous frame and current frame input results for each frequency according to a current frame, generating a current frame variance estimation value based on the current frame input results and a previous frame beamforming weight, generating a current frame noise covariance based on the previous frame noise covariance corresponding to the previous frame and the current frame variance estimation value, and generating a current frame steering vector based on the current frame input signal covariance, the current frame noise covariance, and a previous frame steering vector; and a beamformer generating a current frame beamforming variance estimation value according to the previous frame beamforming weight, the current frame input results, and a previous frame variance, generating a current frame beamforming inverse covariance based on a previous frame inverse covariance, the current frame input results, and the current frame beamforming variance estimation value, generating a current frame beamforming weight according to the current frame beamforming inverse covariance and the current frame steering vector, and providing current frame output results based on the current frame input results and the current frame beamforming weight.

12. The online target signal extraction apparatus of claim 11, wherein the current frame noise covariance is normalized by a current frame variance estimation value.

* * * * *